(12) United States Patent
Kurata et al.

(10) Patent No.: US 9,669,678 B2
(45) Date of Patent: Jun. 6, 2017

(54) VEHICLE STATE DETECTION DEVICE

(71) Applicants: Fumito Kurata, Gotenba (JP); Takashi Suzuki, Susono (JP)

(72) Inventors: Fumito Kurata, Gotenba (JP); Takashi Suzuki, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/649,433

(22) PCT Filed: Dec. 11, 2012

(86) PCT No.: PCT/JP2012/082056
§ 371 (c)(1),
(2) Date: Jun. 3, 2015

(87) PCT Pub. No.: WO2014/091553
PCT Pub. Date: Jun. 19, 2014

(65) Prior Publication Data
US 2015/0343874 A1    Dec. 3, 2015

(51) Int. Cl.
*B60G 17/019*     (2006.01)
*G01D 5/12*       (2006.01)
(Continued)

(52) U.S. Cl.
CPC ......... *B60G 17/019* (2013.01); *B60G 17/018* (2013.01); *B60G 17/0165* (2013.01);
(Continued)

(58) Field of Classification Search
CPC  B60G 17/0165; B60G 17/018; B60G 17/019; B60G 17/0195; B60G 17/06;
(Continued)

(56) References Cited

U.S. PATENT DOCUMENTS

| 5,295,705 A | * | 3/1994 | Butsuen | ................. | B60G 17/08 |
| | | | | | 188/266.4 |
| 2005/0072223 A1 | | 4/2005 | Fennel et al. | | |

(Continued)

FOREIGN PATENT DOCUMENTS

| JP | 2002-096632 A | 4/2002 |
| JP | 2005524054 A  | 8/2005 |

(Continued)

*Primary Examiner* — Adam Tissot
*Assistant Examiner* — Tamara Weber
(74) *Attorney, Agent, or Firm* — Sughrue Mion, PLLC

(57) ABSTRACT

An unsprung state detection part (140) calculates a variation amount X (=|φ−φ'|), which is a magnitude of a difference between a detected angle φ output from a resolver rotational angle sensor (40) for detecting a rotational angle of an in-wheel motor (30) and an estimated angle φ' of a motor rotational angle (S11 to S13). The estimated angle φ' can be calculated by adding an estimated angle of the rotation of the motor (30) in one calculation cycle to a detected angle φn−1 of the previous calculation cycle. When the variation amount X is more than a road surface determination threshold Xref, the unsprung state detection part (140) determines that the travel road on which a vehicle (1) is traveling is a rough road (S14, S15). As a result, the road surface determination can be made by using the rotational angle sensor (40).

11 Claims, 18 Drawing Sheets

(51) Int. Cl.
*G01B 7/30* (2006.01)
*B60G 17/0195* (2006.01)
*B60W 40/068* (2012.01)
*B60G 17/0165* (2006.01)
*B60G 17/018* (2006.01)
*B60G 17/06* (2006.01)
*B60W 40/06* (2012.01)
*B60K 7/00* (2006.01)

(52) U.S. Cl.
CPC ......... *B60G 17/0195* (2013.01); *B60G 17/06* (2013.01); *B60W 40/06* (2013.01); *B60W 40/068* (2013.01); *G01B 7/30* (2013.01); *G01D 5/12* (2013.01); *B60G 2400/052* (2013.01); *B60G 2400/0521* (2013.01); *B60G 2400/0522* (2013.01); *B60G 2500/10* (2013.01); *B60K 7/0007* (2013.01); *B60W 2510/082* (2013.01); *B60W 2520/28* (2013.01)

(58) Field of Classification Search
CPC ...... B60G 2400/0521; B60G 2400/052; B60G 2400/0522; B60G 2500/10; B60W 40/06; B60W 40/068; B60W 2510/082; B60W 2520/28; B60K 7/0007; G01B 7/30; G01D 5/12
See application file for complete search history.

(56) References Cited

U.S. PATENT DOCUMENTS

| | | | |
|---|---|---|---|
| 2010/0276896 A1* | 11/2010 | Sano | B60G 17/0152 280/5.509 |
| 2010/0324780 A1* | 12/2010 | Koumura | B60G 17/0165 701/38 |
| 2011/0144848 A1* | 6/2011 | Yoshizue | B60K 7/0007 701/22 |
| 2013/0271122 A1* | 10/2013 | Kino | G01B 7/30 324/207.25 |

FOREIGN PATENT DOCUMENTS

| | | |
|---|---|---|
| JP | 2006-060913 A | 3/2006 |
| JP | 2006-160185 A | 6/2006 |
| JP | 2010101763 A | 5/2010 |
| JP | 2010-200587 A | 9/2010 |
| JP | 2012-037367 A | 2/2012 |
| WO | 03031990 A1 | 4/2003 |

* cited by examiner

US 9,669,678 B2

VEHICLE STATE DETECTION DEVICE

CROSS REFERENCE TO RELATED APPLICATIONS

This application is a National Stage of International Application No. PCT/JP2012/082056 filed Dec. 11, 2012, the contents of all of which are incorporated herein by reference in their entirety.

TECHNICAL FIELD

The present invention relates to a vehicle state detection device for detecting an external force acting on a vehicle.

BACKGROUND ART

Hitherto, there has been known a device for detecting a travel state of a vehicle and causing a damper to generate a damping force corresponding to the travel state. For example, a control device proposed in Patent Literature 1 includes unsprung acceleration sensors for detecting accelerations of unsprung parts (wheels) in a vertical direction, sprung acceleration sensors for detecting an acceleration of a sprung part (vehicle body) in the vertical direction, a roll rate sensor for detecting a roll rate of the vehicle, and a pitch rate sensor for detecting a pitch rate of the vehicle, and controls damping forces of dampers of suspensions based on detection signals of those sensors.

CITATION LIST

Patent Literature

[PTL 1] JP 2006-160185 A

SUMMARY OF INVENTION

However, a large number of sensors are necessary for detecting the state of the vehicle. For example, in order to detect a vibration state of the unsprung parts, a total of four unsprung acceleration sensors are necessary for front/rear and left/right wheels. When dedicated sensors for detecting the forces acting on the vehicle are mounted, disadvantages arise in terms of cost, weight, installation space, and the like.

The present invention has been made in view of the above-mentioned problem, and therefore has an object to detect a force acting on a vehicle by using a rotational angle sensor of a motor, which is an existing sensor mounted on the vehicle.

In order to achieve the above-mentioned object, one feature of one embodiment of the present invention resides in a vehicle state detection device to be applied to a vehicle, the vehicle including:

a motor (30, 71); and
a rotational angle sensor (40, 72) including:
  a magnetism detection signal output part including a rotor (42) to be rotated by a rotation of the motor, and a stator (43) arranged around the rotor, the magnetism detection signal output part being configured to output a magnetism detection signal changing in response to a relative positional relationship between the rotor and the stator; and
  a rotational angle calculation part (50) for calculating a rotational angle of the motor based on the magnetism detection signal output by the magnetism detection signal output part, the vehicle state detection device including external force index acquisition means (140) for detecting a variation (Ya, Yb, Xa, Xb) in the magnetism detection signal output from the magnetism detection signal output part, which is not caused by a change in the rotational angle of the motor, or a variation (X) in the calculated rotational angle calculated by the rotational angle calculation part, which is not caused by the change in the rotational angle of the motor, and for acquiring a magnitude of the variation as an index of a magnitude of a force acting on the vehicle from an outside.

A vehicle to which the state detection device according to one embodiment of the present invention is applied carries a motor whose rotational angle is detected by the rotational angle sensor. The rotational angle sensor includes the magnetism detection signal output part including the rotor to be rotated by a rotation of the motor, and the stator arranged around the motor, the magnetism detection signal output part being configured to output the magnetism detection signal changing in response to the relative positional relationship between the rotor and the stator, and the rotational angle calculation part for calculating the rotational angle of the motor based on the magnetism detection signal output by the magnetism detection signal output part. For example, the magnetism detection signal output part includes a magnetism generation part arranged on one of the rotor and the stator, and a magnetism detection part arranged on the other, to thereby output a magnetism detection signal corresponding to a relative position between the rotor and the stator. The rotor of the magnetism detection signal output part may be, for example, formed integrally with a rotor shaft of the motor, or may be coupled to the rotor shaft of the motor. In the case where the rotor of the magnetism detection signal output part is integrally formed with the rotor shaft of the motor, the rotor integrally rotates with the rotor shaft, and in the case where the rotor is coupled to the rotor shaft of the motor, the rotor is rotated by a rotational force transmitted from the rotor shaft. Moreover, the magnetism generation part may be, for example, of a type which generates the magnetism from an excitation coil, or of a type which generates the magnetism from a permanent magnet.

When a force is applied from the outside to the vehicle, and the force is transmitted to the motor, a relative position between the rotor and the stator of the rotational sensor changes in a direction other than the rotational direction, such as a radial direction orthogonal to a rotor axis or a rotor axis direction. As a result, the magnetism detection signal output from the magnetism detection signal output part and the calculated rotational angle calculated by the rotational angle calculation part vary. Moreover, as the force applied to the vehicle increases, the change of the relative position increases, and the variations in the magnetism detection signal output from the magnetism detection signal output part and the calculated rotational angle calculated by the rotational angle calculation part increase.

According to one embodiment of the present invention, this phenomenon is used to acquire an index representing a degree of the magnitude of the force acting on the vehicle from the outside. As a configuration for this purpose, the state detection device according to the one embodiment of the present invention includes external force index acquisition means. The external force index acquisition means detects a variation in the magnetism detection signal output from the magnetism detection signal output part, which is not caused by a change in the rotational angle of the motor, or a variation in the calculated rotational angle calculated by the rotational angle calculation part, which is not caused by the change in the rotational angle of the motor. Then, the external force index acquisition means acquires a magnitude of the variation as the index of the magnitude of the force acting on the vehicle from the outside.

As a result, according to the one embodiment of the present invention, not only the rotational angle of the motor, but also the degree of the magnitude of the force acting on the vehicle may be detected by using the rotational angle sensor. As a result, the magnitude of the external force acting on the vehicle may be detected without providing a dedicated sensor, resulting in reductions in the cost, the weight, and the size.

For example, when the external force index acquisition means detects the variation in the magnetism detection signal output from the magnetism detection signal output part, which is not caused by the change in the rotational angle of the motor, the external force index acquisition means may detect a deviation between an output value of the magnetism detection signal and an estimated value of the magnetism detection signal derived from a motor rotational angle estimated value as the magnitude of the variation in the magnetism detection signal. Moreover, for example, when the external force index acquisition means detects the variation in the calculated rotational angle calculated by the rotational angle calculation part, which is not caused by the change in the rotational angle of the motor, the external force index acquisition means may detect a deviation between the calculated rotational angle calculated by the rotational angle calculation part and the rotational angle estimated value as the magnitude of the variation in the calculated rotational angle. In this case, the rotational angle estimated value may be acquired by adding, for example, a rotational angle read from the rotational angle sensor before a unit time (such as one reading cycle) and an estimated rotational angle increment, which is an estimation of the rotation of the motor after the rotational angle is read.

Another feature of one embodiment of the present invention resides in that the motor is installed on an unsprung part (10) of the vehicle.

The external force input from the road surface acts on unsprung parts. The unsprung part is a part arranged below (on the road surface side of) the vehicle with respect to a suspension spring. The unsprung part is a part which receives the external force input from the road surface. Due to the external force input from the road surface, it is likely to obtain the change in the relative position between the rotor and the stator of the rotational angle sensor in a direction that is different from the rotational direction. As a result, according to the one embodiment of the present invention, the external force input from the road surface to the unsprung part may be excellently detected. In this case, the change in the relative position between the rotor and the stator of the rotational angle sensor may be acquired by the external force input from the road surface directly acting on the rotational angle sensor, or the change in the relative position between the rotor and the stator of the motor may be transmitted to the rotational angle sensor to acquire the change in the relative position between the rotor and the stator of the rotational angle sensor, or such a configuration that both thereof are combined may be employed.

Another feature of one embodiment of the present invention resides in that the vehicle state detection device further includes road surface determination means (140, S14 to S16, S28 to S32, S44 and S45, S78 to S81, and S95 to S98) for determining, based on the index of the magnitude of the force acquired by the external force index acquisition means, a state of a road surface on which the vehicle is traveling.

When the vehicle is traveling on a rough road, compared with a case in which the vehicle is traveling on a smooth road, a large external force is input to the unsprung part, and the unsprung part vibrates greatly. As a result, the variations in the magnetism detection signal and the calculated rotational angle of the rotational angle sensor, which are not caused by a change in the rotational angle of the motor, increase. The road surface determination means uses this phenomenon to determine, based on the index of the force acquired by the external force index acquisition means, the state of the road surface on which the vehicle is traveling. Thus, according to the one embodiment of the present invention, the state of the road surface on which the vehicle is traveling may be determined by using the rotational angle sensor.

Another feature of one embodiment of the present invention resides in that the rotational angle sensor is a resolver rotational angle sensor, the resolver rotational angle sensor including:

a resolver (41) including:
an excitation coil (44) to be supplied with an excitation AC signal;
a sin phase detection coil (45) to be excited by the excitation coil to output a sin phase detection signal, which is a voltage signal having an amplitude corresponding to a sin value of a relative rotational angle of the rotor with respect to the stator; and
a cos phase detection coil (46) to be excited by the excitation coil to output a cos phase detection signal, which is a voltage signal having an amplitude corresponding to a cos value of the relative rotational angle of the rotor with respect to the stator; and
a resolver calculation part (50) for calculating the rotational angle of the motor based on the sin phase detection signal and the cos phase detection signal output by the resolver.

According to the one embodiment of the present invention, the resolver rotational angle sensor is mounted as the rotational angle sensor. The resolver rotational angle sensor includes the resolver and the resolver calculation part. The resolver includes the excitation coil on one of the rotor and the stator, and the sin phase detection coil and the cos phase detection coil on the other. The voltage signal having the amplitude corresponding to the sin value of the relative rotational angle of the rotor with respect to the stator is output from the sin phase detection coil, and the voltage signal having the amplitude corresponding to the cos value of the relative rotational angle of the rotor with respect to the stator is output from the cos phase detection signal. The resolver calculation part calculates the rotational angle of the motor based on the sin phase detection signal and the cos phase detection signal output by the resolver.

When an external force acts on the resolver, as the external force becomes larger, the relative position between the rotor and the stator changes more in a direction other than the rotational direction. As a result, an output variation of the sin phase detection coil and an output variation of the cos phase detection coil, which are not caused by the change in the rotational angle of the motor, are generated, and a variation in the rotational angle of the motor (namely, the rotational angle of the rotor of the resolver) calculated by the resolver calculation part is also generated. Thus, the external force index acquisition means may acquire an index of the magnitude of the external force acting on the unsprung part based on the variations in the outputs of the detection coils or the variation in the calculated rotational angle.

Another feature of one embodiment of the present invention resides in that:

the resolver is configured such that the excitation coil (44) is arranged on the rotor (42) and the sin phase detection coil (45) and the cos phase detection coil (46) are arranged on the stator (43); and one of the sin phase detection coil and the cos phase detection coil is arranged so that a vehicle vertical direction component of the arrangement of the one of the sin phase detection coil and the cos phase detection coil with respect to the rotor is more than a vehicle vertical direction component of the arrangement of another of the sin phase detection coil and the cos phase detection coil with respect to the rotor, and the another of the sin phase detection coil and the cos phase detection coil is arranged so that a vehicle longitudinal direction component of the arrangement of the another of the sin phase detection coil and the cos phase detection coil with respect to the rotor is more than a vehicle longitudinal direction component of the arrangement of the one of the sin phase detection coil and the cos phase detection coil with respect to the rotor; and the resolver further includes direction determination means (S26 to S32) for determining, based on a variation in the sin phase detection signal and a variation in the cos phase detection signal, which are not caused by the change in the rotational angle of the motor, whether a direction of a force acting on the unsprung part from the road surface is the vehicle vertical direction or the vehicle longitudinal direction.

For example, when the unsprung part is vibrated in the vehicle vertical direction by the external force input from the road surface, the relative position between the rotor and the stator of the resolver changes mainly in the vehicle vertical direction. Moreover, when the unsprung part is vibrated in the vehicle longitudinal direction by the external force input from the road surface, the relative position between the rotor and the stator of the resolver changes mainly in the vehicle longitudinal direction. In the resolver according to the one embodiment of the present invention, the excitation coil is arranged on the rotor and the sin phase detection coil and the cos phase detection coil are arranged on the stator. One of the sin phase detection coil and the cos phase detection coil is arranged on the stator so that a vehicle vertical direction component of the arrangement of the one of the sin phase detection coil and the cos phase detection coil with respect to the rotor is more than a vehicle vertical direction component of the arrangement of another of the sin phase detection coil and the cos phase detection coil with respect to the rotor, and the another of the sin phase detection coil and the cos phase detection coil is arranged so that a vehicle longitudinal direction component of the arrangement of the another of the sin phase detection coil and the cos phase detection coil with respect to the rotor is more than a vehicle longitudinal direction component of the arrangement of the one of the sin phase detection coil and the cos phase detection coil with respect to the rotor. Therefore, the magnitude of the variation in the detection signal of the sin phase detection coil and the magnitude of the variation in the detection signal of the cos phase detection coil, which are not caused by the change in the rotational angle of the motor, are different between when the unsprung part vibrates mainly in the vehicle vertical direction and when the unsprung part vibrates mainly in the vehicle longitudinal direction. For example, in a configuration where the sin phase detection coil is arranged so that the vehicle vertical direction component of the arrangement of the sin phase detection coil with respect to the rotor is more than the vehicle vertical direction component of the arrangement of the cos phase detection coil with respect to the rotor (in this case, the cos phase detection coil is arranged so that the vehicle longitudinal direction component of the arrangement of the cos phase detection coil with respect to the rotor is more than the vehicle longitudinal direction component of the arrangement of the sin phase detection coil with respect to the rotor), when the unsprung part vibrates mainly in the vehicle vertical direction, the variation in the output of the detection signal of the sin phase detection coil is more than the variation in the output of the detection signal of the cos phase detection coil.

The direction determination means uses this phenomenon to determine, based on the variation in the sin phase detection signal and the variation in the cos phase detection signal, which are not caused by the change in the rotational angle of the motor, whether the direction of the force acting on the unsprung part from the road surface is the vehicle vertical direction or the vehicle longitudinal direction. Thus, according to the one embodiment of the present invention, the rotational angle sensor may be used not only to acquire the index of the magnitude of the force acting on the unsprung part from the road surface, but also to determine whether the direction of the force is the vehicle vertical direction or the vehicle longitudinal direction. Therefore, the state of the vehicle may be detected in more detail.

Another feature of one embodiment of the present invention resides in that the vehicle state detection device further includes lateral direction force detection means (S43 to S45) for determining, when both outputs of the sin phase detection signal and the cos phase detection signal are less than a threshold, that a force in a vehicle lateral direction is acting on the unsprung part from the road surface.

In the case where a rotational center axis of the rotor of the resolver is directed in the vehicle lateral direction (vehicle widthwise direction), when a force acts on the unsprung part from the road surface in the vehicle lateral direction, the relative position between the rotor and the stator changes in the axial direction of the rotor. This change decreases the outputs of both the sin phase detection signal and the cos phase detection signal compared with a case in which the change does not exist. The lateral direction force detection means uses this phenomenon to determine, when both outputs of the sin phase detection signal and the cos phase detection signal are less than the threshold, that a force in the vehicle lateral direction is acting on the unsprung part from the road surface. Thus, according to the one embodiment of the present invention, the state of the vehicle may be detected in more detail by using the rotational angle sensor.

Another feature of one embodiment of the present invention resides in that a resonance frequency of a support part (31, 38) for supporting the rotor in the motor or the resolver is set to be different from an unsprung resonance frequency.

In a case where the resonance frequency of the support part for supporting the rotor in the motor or the support part for supporting the rotor in the resolver is included in an unsprung resonance frequency band, even when the unsprung part is vibrating at the unsprung resonance frequency, the detection signal or the calculated rotational angle may vary, and an accuracy of the index representing the magnitude of the external force input from the road surface to the unsprung part may decrease. Thus, according to the one embodiment of the present invention, the resonance frequency of the support part for supporting the shaft in the motor or the resolver is set to be different from the unsprung resonance frequency, and the index representing the magnitude of the external force input from the road surface to the unsprung part is thus more appropriate. Note that, the resonance frequency of the support part is determined by rigidity of the support part, and increases as the rigidity increases. Thus, the resonance frequency of the support part may be set so as not to be included in the unsprung resonance frequency band by adjusting the rigidity of the support part.

Another feature of one embodiment of the present invention resides in that:

a resonance frequency in the vehicle vertical direction and a resonance frequency in the vehicle longitudinal direction of a support part (31, 38) for supporting the rotor in the motor or the resolver are set to be different from each other; and the vehicle state detection device further includes frequency use direction determination means (S51 to S57) for analyzing frequency components of the rotational angle calculated by the rotational angle calculation part, and determining, based on a magnitude of a resonance frequency component in the vehicle vertical direction of the support part and a magnitude of a resonance frequency component in the vehicle longitudinal direction of the support part included in the frequency components of the rotational angle, whether a direction of a force acting on the unsprung part from the road surface is the vehicle vertical direction or the vehicle longitudinal direction.

According to the one embodiment of the present invention, the resonance frequency in the vehicle vertical direction of the support part for supporting the rotor in the motor or the support part for supporting the rotor in the resolver and the resonance frequency thereof in the vehicle longitudinal direction are set to be different from each other. For example, the resonance frequency in the vehicle vertical direction and the resonance frequency in the vehicle longitudinal direction of the support part may be set to be different from each other by setting the rigidity of the support part of the rotor so that the rigidity of the support part of the rotor in the vehicle vertical direction and the rigidity of the support part of the rotor in the vehicle longitudinal direction are different from each other. Therefore, when the unsprung part is vibrated by the external force input from the road surface to the unsprung part, frequency components of the rotational angle calculated by the rotational angle calculation part are different between the case in which the vibration of the unsprung part is in the vehicle vertical direction and the case in which the vibration is in the vehicle longitudinal direction. In other words, when the vibration of the unsprung part is in the vehicle vertical direction, the frequency components calculated by the rotational angle calculation part include a large amount of the resonance frequency components in the vehicle vertical direction, and when the vibration of the unsprung part is in the vehicle longitudinal direction, the frequency components calculated by the rotational angle calculation part include a large amount of the resonance frequency components in the vehicle longitudinal direction. The frequency use direction determination means uses this phenomenon to analyze the frequency components of the rotational angle calculated by the rotational angle calculation part, and determine, based on the magnitude of the resonance frequency component in the vehicle vertical direction of the support part and the magnitude of the resonance frequency component in the vehicle longitudinal direction of the support part included in the frequency components of the rotational angle, whether the direction of the force acting on the unsprung part from the road surface is the vehicle vertical direction or the vehicle longitudinal direction. Thus, according to the one embodiment of the present invention, the state of the vehicle may be detected in more detail by using the rotational angle sensor.

Another feature of one embodiment of the present invention resides in that the motor is an in-wheel motor (30) installed on the unsprung part of the vehicle for driving a wheel.

According to the one embodiment of the present invention, the rotational angle sensor for detecting the rotational angle of the in-wheel motor is used to acquire the index representing the magnitude of the force acting on the unsprung part from the road surface. Thus, the rotational angle sensor of the in-wheel motor may be effectively used. Moreover, the vibration state of the wheel may be precisely detected. Therefore, for example, the road surface state of a travel road of the vehicle may be appropriately determined.

Another feature of one embodiment of the present invention resides in that the motor is a motor (71) installed on the unsprung part of the vehicle for applying only a braking force to a wheel.

According to the one embodiment of the present invention, the rotational angle sensor of the motor installed on the unsprung part of the vehicle for applying only a braking force to a wheel is used to acquire the index representing the magnitude of the force acting on the unsprung part from the road surface. For example, as this motor, a motor arranged in an electric parking brake device and configured to press brake pads against a brake disc while the vehicle is stopping, or a motor arranged in an electric brake actuator and configured to press brake pads against a brake disc in response to a brake pedal operation by a driver may be used. The motor rotational angle sensor outputs the magnetism detection signal and the calculated rotational angle regardless of whether the motor is being driven or not. Thus, the external force index acquisition means may detect the variation in the magnetism detection signal or the variation in the calculated rotational angle, which is not caused by the change in the rotational angle of the motor. As a result, according to the one embodiment of the present invention, the rotational angle sensor for detecting the rotational angle of the motor for generating a braking force may be used to detect the magnitude of the force acting on the unsprung part from the road surface. For example, a vibration state of the wheel may be detected.

Another feature of one embodiment of the present invention resides in that:

the motor is a motor (71) is installed on the unsprung part of the vehicle, and configured not to rotate while the vehicle is traveling;

the vehicle state detection device further includes storage means (S63, S68) for storing the rotational angle of the motor or a magnitude of the magnetism detection signal after an end of a previous operation of the motor; and the external index acquisition means (S76 and S77, S94) detects, during a travel of the vehicle, a variation (Xa, Xb) in the magnitude of the magnetism detection signal output from the magnetism detection signal output part with respect to the magnitude of the magnetism detection signal derived from the rotational angle stored in the storage means or the magnitude of the magnetism detection signal stored in the storage means.

In the case of the motor which does not rotate during the vehicle travel, the rotor of the rotational angle sensor does not rotate either, and the output value of the magnetism detection signal is a value corresponding to a position at which the rotor is stopped. The rotational position (stop angle) at which the rotor is stopped is not always constant, and it is thus difficult to determine the magnitude of the force acting on the unsprung part from the outside based only on the output value of the magnetism detection signal. Thus, according to the one embodiment of the present invention, the storage means stores the rotational angle of the motor or the magnitude of the magnetism detection signal after the end of the previous operation of the motor. Then, the external index acquisition means detects, during the travel of the vehicle, a variation in the magnitude of the magnetism detection signal output from the magnetism detection signal output part with respect to the magnitude of the magnetism detection signal derived from the rotational angle stored in the storage means or the magnitude of the magnetism detection signal stored in the storage means. As a result, the external force index acquisition means may acquire the index of the magnitude of the force input from the road surface to the unsprung part. As a result, according to the one embodiment of the present invention, the rotational angle sensor of the motor which does not rotate during the travel may be used to detect the magnitude of the force acting on the unsprung part from the road surface.

For facilitating the understanding of the invention, in the above description, the configurations of the invention corresponding to the embodiments are suffixed in parentheses with symbols used in the embodiments. However, the components of the invention are not intended to be limited to the embodiments as defined by the symbols

DESCRIPTION OF EMBODIMENTS

Figure 1:
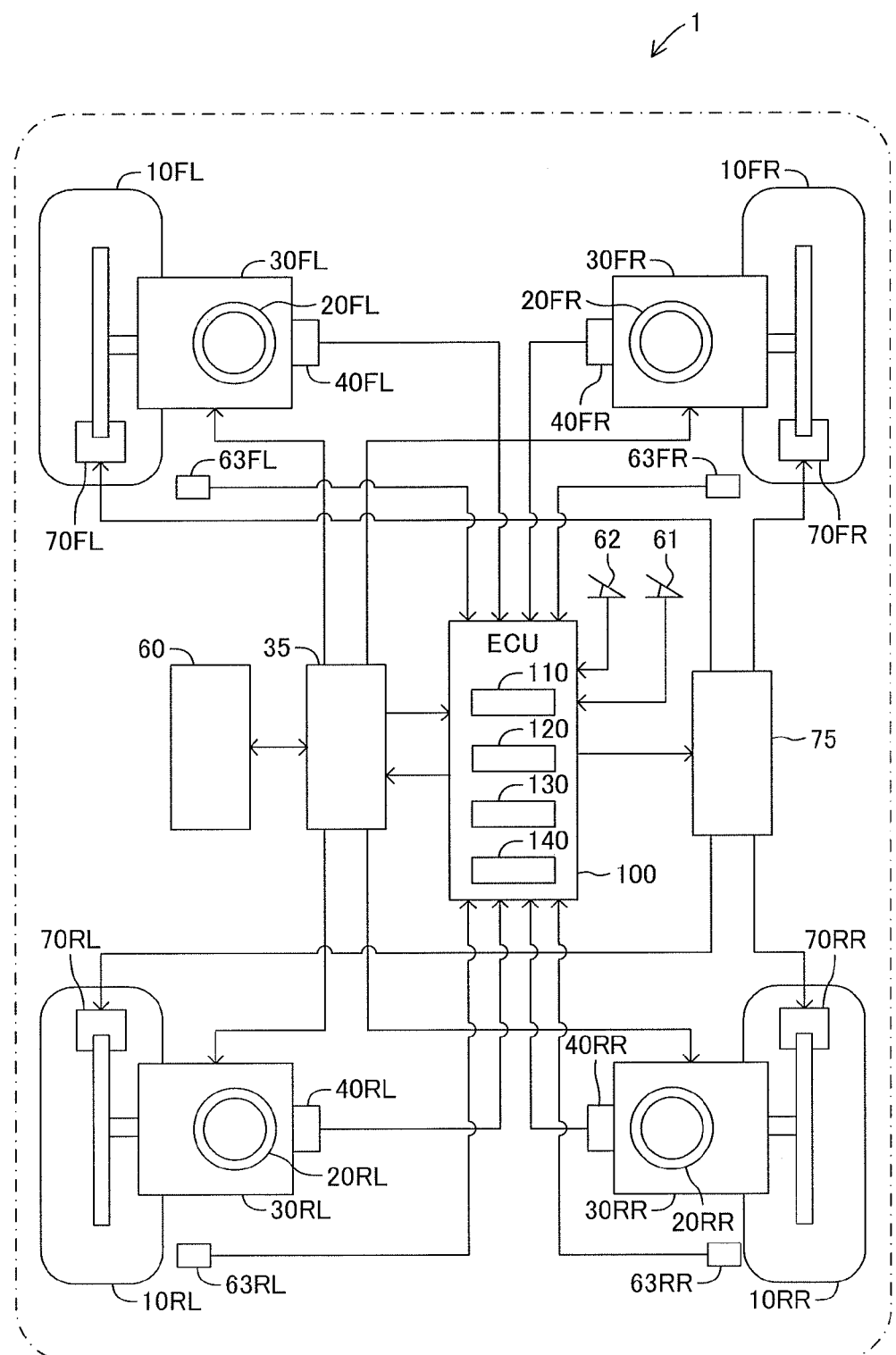
FIG. 1 is a schematic configuration diagram of a vehicle on which a vehicle state detection device according to a first embodiment of the present invention is installed.

Now, a description is given of embodiments of the present invention referring to the drawings. FIG. 1 schematically illustrates a configuration of a vehicle 1 on which a vehicle state detection device according to a first embodiment of the present invention is installed.

The vehicle 1 includes a front left wheel 10FL, a front right wheel 10FR, a rear left wheel 10RL, and a rear right wheel 10RR. The front left wheel 10FL, the front right wheel 10FR, the rear left wheel 10RL, and the rear right wheel 10RR are respectively supported on a vehicle body B via independent suspensions 20FL, 20FR, 20RL, and 20RR. In the following, unless an arbitrary one of the respective wheels 10FL, 10FR, 10RL, and 10RR needs to be specified, the wheels are collectively referred to as wheels 10. Moreover, for a configuration employed in correspondence to each of the wheels 10, "FL" is suffixed to the reference numeral of the configuration employed in correspondence to the front left wheel 10FL. "FR" is suffixed to the reference numeral of the configuration employed in correspondence to the front right wheel 10FR. "RL" is suffixed to the reference numeral of the configuration employed in correspondence to the rear left wheel 10RL. "RR" is suffixed to the reference numeral of the configuration employed in correspondence to the rear right wheel 10RR. Unless an arbitrary one of the respective wheels needs to be specified, the suffix symbols are omitted.

The suspension 20 can employ a suspension of a known independent four-wheel suspension type, such as a strut suspension constructed of a strut incorporating a shock absorber, a coil spring, and a suspension arm, and a wishbone suspension constructed of a coil spring, a shock absorber, and upper and lower suspension arms.

A member arranged below (on a road surface side of) the coil spring of the suspension 20 with respect to the vehicle, namely a member arranged on the wheel 10 side supported on the vehicle body B by the suspension 20, is referred to as an unsprung part.

Motors 30FL, 30FR, 30RL, and 30RR are respectively incorporated into the front left wheel 10FL, the front right wheel 10FR, the rear left wheel 10RL, and the rear right wheel 10RR. Each of the motors 30 is a so-called in-wheel motor, which is fixed to the unsprung part together with the wheel 10 in a manner that enables power transmission to the corresponding wheel 10. In the vehicle 1, a driving force or a braking force (braking force by electric power regeneration) to be generated on the respective wheels 10 can be independently controlled by independently controlling rotations of the respective motors 30. For example, brushless motors are used as the motors 30.

Each of the motors 30 is connected to a motor driver 35. The motor driver 35 includes, for example, inverters, and four sets of inverters are arranged for the respective motors 30 to invert DC power supplied from a battery 60 into AC power, and independently supply the AC power to the respective motors 30. As a result, the respective motors 30 are drive-controlled to apply the driving forces to the respective wheels 10. The motor 30 is the brushless motor, and hence the motor rotational angle needs to be detected to control a current phase. For this purpose, rotational angle sensors 40FL, 40FR, 40RL, and 40RR each for detecting the motor rotational angle are incorporated into the respective motors 30FL, 30FR, 30RL, and 30RR.

Moreover, brake mechanisms 70FL, 70FR, 70RL, and 70RR are arranged for the respective wheels 10FL, 10FR, 10RL, and 10RR. The respective brake mechanisms 70 are, for example, publicly-known braking devices such as disc brakes and drum brakes. Those brake mechanisms 70 are connected to a brake actuator 75, and a piston (not shown) of a brake caliper is operated by a hydraulic pressure supplied from the brake actuator 75, to thereby generate the braking force on each wheel 10.

The motor driver 35 and the brake actuator 75 are each connected to an electronic control unit 100. The electronic control unit 100 (hereinafter referred to as ECU 100) includes a microcomputer formed of a CPU, a ROM, and a RAM as a main component, and executes various programs to independently control operations of the motors 30 and the brake mechanisms 70. For this purpose, an accelerator sensor 61 for detecting an accelerator operation amount by a driver based on a depression amount (or an angle, a pressure, or the like) of an accelerator pedal, a brake sensor 62 for detecting a brake operation amount by the driver based on a depression amount (or an angle, a pressure, or the like) of a brake pedal, and wheel speed sensors 63FL, 63FR, 63RL, and 63RR for detecting wheel speeds of the respective wheels 10 are connected to the ECU 100, and sensor signals representing the accelerator operation amount, the brake operation amount, and the wheel speeds of the four wheels are input to the ECU 100. Moreover, signals representing the motor rotational angles output by the respective rotational angle sensors 40 are input to the ECU 100. Moreover, sensor signals necessary for the motor control, such as signals representing current values flowing from the motor driver 35 to the respective motors 30 and a signal representing a voltage value supplied to the motor driver 35, are input to the ECU 100 from the motor driver 35. Note that the wheel speed may be acquired by calculation from a change amount per unit time in the motor rotational angle output by the rotational angle sensor 40. In this case, the wheel speed sensors 63 can be omitted.

The ECU 100 includes a braking/driving force calculation part 110, a motor control part 120, a hydraulic brake control part 130, and an unsprung state detection part 140. The braking/driving force calculation part 110 calculates, based on the signals input from the accelerator sensor 61 and the brake sensor 62, a required driving force and a required braking force (target driving force and target braking force) corresponding to an accelerator operation amount and a brake operation amount, respectively, generated by the driver, namely, a total required braking/driving force required to travel or brake the vehicle 1. Then, the braking/driving force calculation part 110 distributes the total required braking/driving force to respective wheel required braking/driving forces to be generated by the motors 30 arranged on the respective wheels 10 in accordance with a predetermined rule. When the value of the required braking/driving force is positive, a driving force is required, and when the value of the required braking/driving force is negative, a braking force is required.

The motor control part 120 generates a motor drive control signal (such as PWM control signal) so that currents corresponding to the respective wheel required braking/driving forces flow through the motors 30, and outputs the motor drive control signal to the motor drive circuit 35. In this case, the motor control part 120 inputs the motor rotational angle detected by the rotational angle sensor 40 thereto, calculates a motor electrical angle corresponding to the motor rotational angle, and uses this motor electrical angle to control a phase angle of the current caused to flow through the motor. When the respective wheel required braking/driving forces are negative, the motor 30 is operated as a generator to generate a regenerative braking torque. In this case, when the respective wheel required braking/driving forces (braking force) are larger than the regenerative braking torque which can be generated by the motor 30, the motor control part 120 sets the respective wheel required braking/driving forces to the maximum regenerative braking torque which can be generated by the motor 30, and calculates an insufficient amount of the braking torque which is not satisfied by the regenerative braking torque as a hydraulic braking command value, and notifies the hydraulic braking command value to the hydraulic pressure brake control part 130. The hydraulic brake control part 130 outputs a control signal to the brake actuator 75 based on the hydraulic braking command value to operate the brake mechanism 70, to thereby generate hydraulic braking torques. The brake actuator 75 includes a power hydraulic pressure source constructed of at least a pressurizing pump and at least an accumulator and the like, and at least a control valve for adjusting a pressure of a brake operation fluid to supply the brake operation fluid to the brake cylinders, and an opening of the control valve is adjusted by the command output from the hydraulic pressure brake control part 130. As a result, a hydraulic braking force is generated in response to the hydraulic braking command value.

In this way, the ECU 100 calculates a total required braking/driving force, which is a braking/driving force required for the vehicle 1, based on the signals input from the accelerator sensor 61 and the brake sensor 62, and outputs the signals for respectively controlling the driving/regeneration states of the respective motors 30 and the operation of the brake actuator 75, namely, the operation of the respective brake mechanisms 70 to generate the total required braking/driving force, thereby controlling the traveling state of the vehicle 1.

Figure 2:
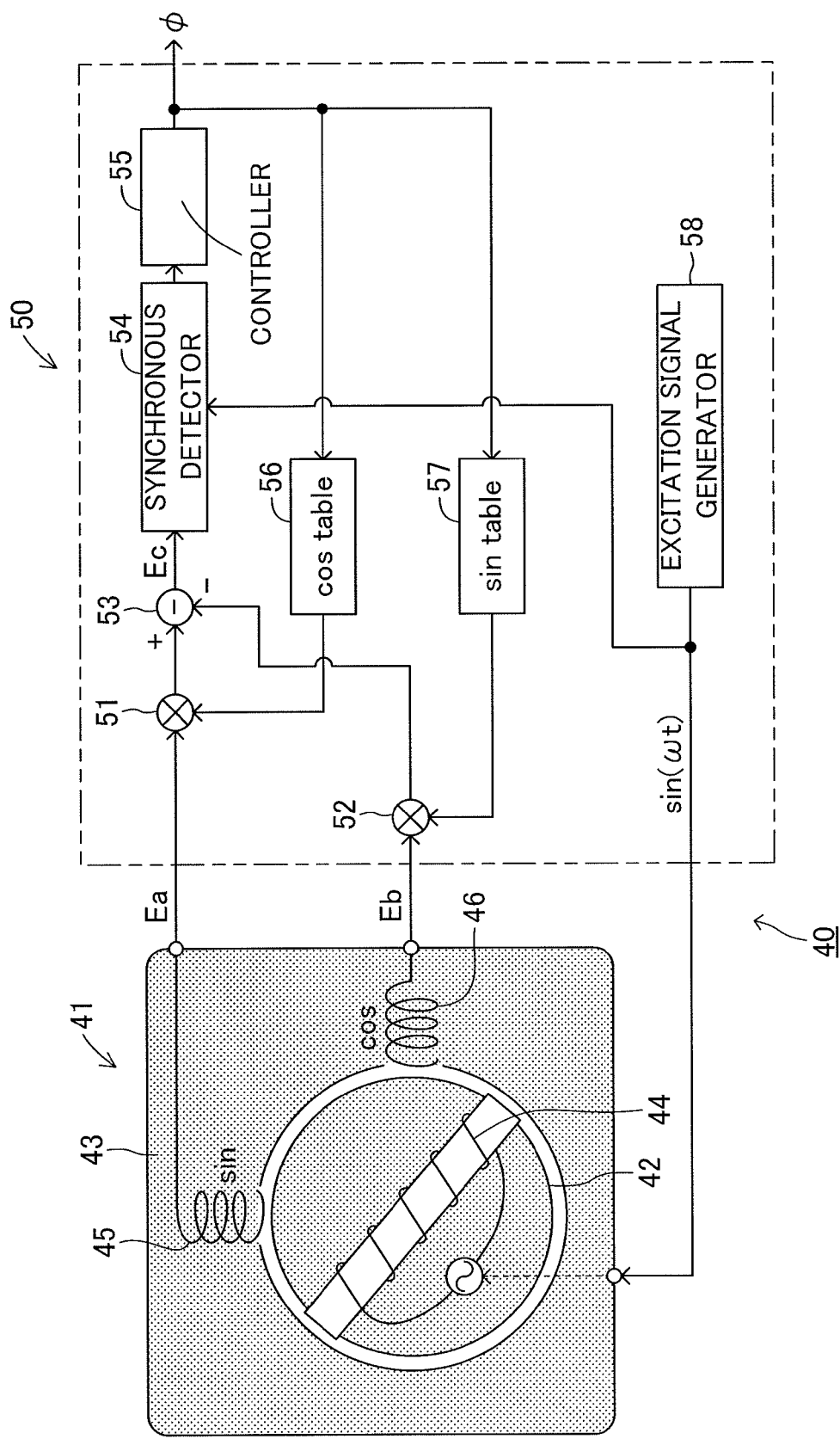
FIG. 2 is a schematic configuration diagram of a rotational angle sensor.

The unsprung state detection part 140 uses the rotational angle sensor 40 for detecting the rotational angle of the motor 30 to detect the external force acting on the unsprung part (wheel 10), thereby determining the state of the travel road surface. First, a description is given of the rotational angle sensor 40. FIG. 2 is a schematic configuration diagram of the rotational angle sensor 40. The rotational angle sensor 40 is a resolver rotational angle sensor including a resolver 41 and a resolver calculator 50 for calculating the rotational angle of the motor 30 based on the detection signal output by the resolver 41. According to this embodiment, the resolver 41 is arranged to be fixed to the motor 30, and the resolver calculator 50 is arranged in the ECU 100, but the resolver 41 and the resolver calculator 50 may be arranged to be fixed to the motor 30 as a unit.

Figure 8:
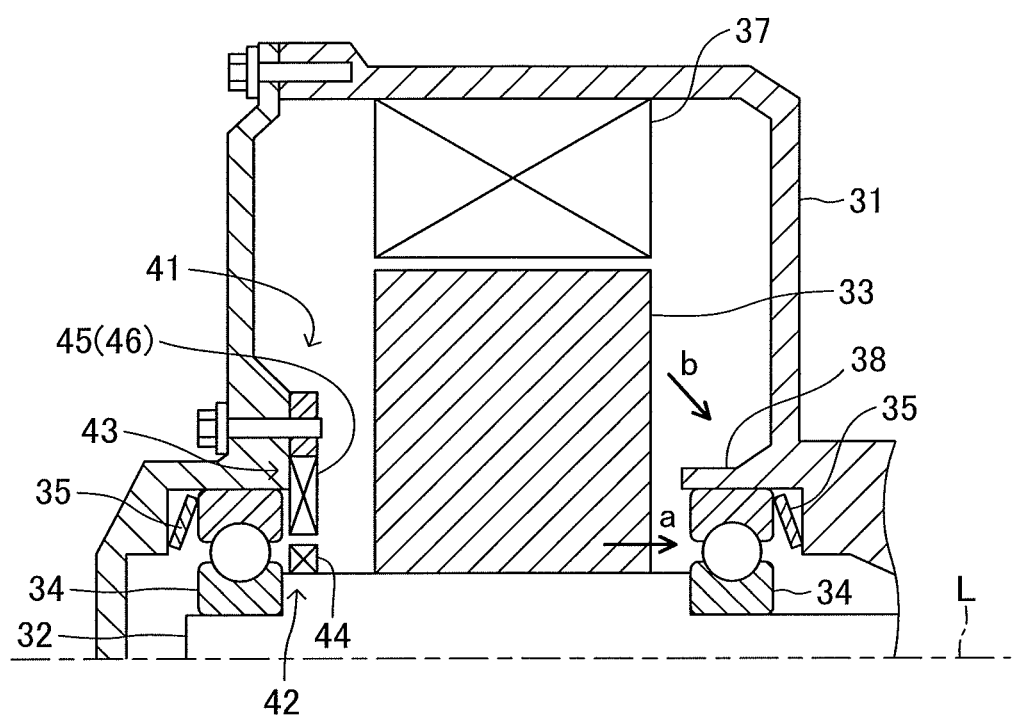
FIG. 8 is a cross sectional view illustrating a schematic configuration of a motor into which the resolver is incorporated.

The resolver 41 includes a resolver rotor 42 including an excitation coil 44 in a fixed manner, and a resolver stator 43 including a sin phase detection coil 45 and a cos phase detection coil 46 in a fixed manner. As illustrated in FIG. 8, the resolver rotor 42 may use a part of the rotor shaft 32 of the motor 30 to fix the excitation coil 44 on a surface of the rotor shaft 32, or may be arranged to be coupled to the rotor shaft 32 of the motor 30. The center axis L of the rotor shaft 32 of the motor 30 directs in the same direction as the direction of a rotational center axis of the wheel 10, and a rotational center axis of the resolver rotor 42 also directs in the same direction as the direction of the rotational center axes of the rotor shaft 32 of the motor 30 and the wheel 10, namely, in a vehicle lateral direction (vehicle widthwise direction).

The resolver stator 43 is fixed to a member fixed to the unsprung part such as a motor casing 31 (refer to FIG. 8) or a resolver casing to surround an outer periphery of the resolver rotor 42 while leaving a gap to the resolver rotor 42.

An excitation voltage (AC voltage) is supplied to the excitation coil 44. The supply of excitation voltage, although not shown, may be carried out by, for example, providing an electric power transmission coil on the resolver stator 43 and an electric power reception coil on the resolver rotor 42, controlling an AC excitation current to flow through the electric power transmission coil, to thereby generate an excitation voltage (AC voltage) on the electric power reception coil (not shown) in a non-contact manner, and supplying the excitation voltage to the excitation coil 44. The excitation coil 44 rotates in synchronization with the rotation of the motor 30. Therefore, a magnetic flux generated from the excitation coil 44 in the radial direction of the resolver rotor 42 rotates as the motor 30 rotates.

The sin phase detection coil 45 and the cos phase detection coil 46 are arranged on a rotational plane of the excitation coil 44, and output AC voltage signals caused by the magnetic flux generated on the excitation coil 44. Amplitude values of the AC voltage signals generated on the sin phase detection coil 45 and the cos phase detection coil 46 change depending on a rotational position of the excitation coil 44 with respect to the sin phase detection coil 45 and the cos phase detection coil 46. In other words, the sin phase detection coil outputs an AC voltage signal having an amplitude corresponding to a sin value of the rotational angle of the resolver rotor 42, and the cos phase detection coil 46 outputs an AC voltage signal having an amplitude corresponding to a cos value of the rotational angle of the resolver rotor 42.

Figure 3:
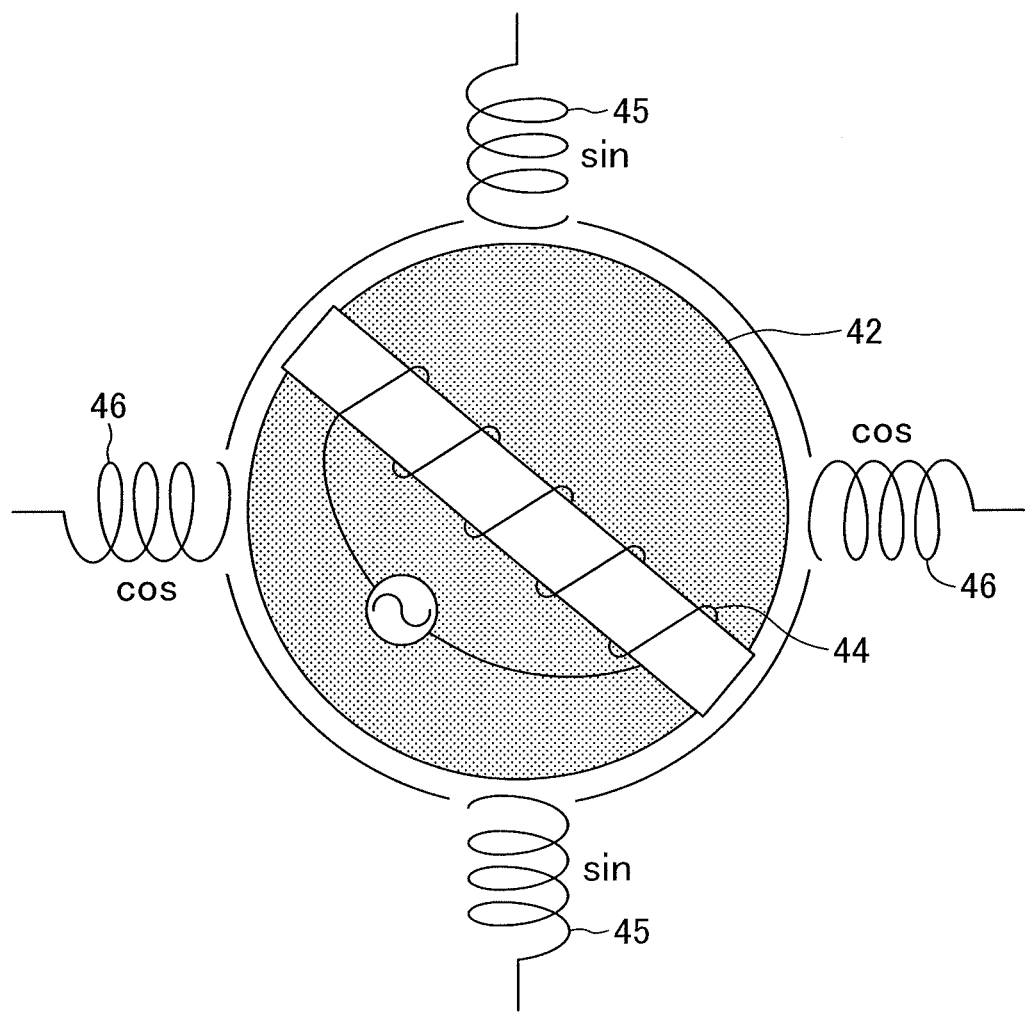
FIG. 3 is an explanatory diagram illustrating an arrangement of a sin phase detection coil and a cos phase detection coil in the rotational angle sensor.

In this resolver 41, the sin phase detection coil 45 is arranged in the vehicle vertical direction with respect to the resolver rotor 42, and the cos phase detection coil 46 is arranged in the vehicle longitudinal direction with respect to the resolver rotor 42. In this example illustrated in FIG. 2, the sin phase detection coil 45 is arranged on one side in the vehicle vertical direction with respect to the resolver rotor 42, and the cos phase detection coil 46 is arranged on one side in the vehicle longitudinal direction with respect to the resolver rotor 42, but, as illustrated in FIG. 3, the sin phase detection coils 45 may be arranged on both sides in the vehicle vertical direction with respect to the resolver rotor 42, and the two sin phase detection coils 45 may be serially connected to each other. Moreover, the cos phase detection coils 46 may be arranged on both sides in the vehicle longitudinal direction with respect to the resolver rotor 42, and the two cos phase detection coils 46 may be serially connected to each other. Moreover, the sin phase detection coil 45 and the cos phase detection coil 46 may be switched to provide the sin phase detection coil 45 in the vehicle longitudinal direction with respect to the resolver rotor 42, and the cos phase detection coil 46 in the vehicle vertical direction with respect to the resolver rotor 42.

The positions of the sin phase detection coil 45 and the cos phase detection coil 46 are determined in this way in order to discriminate between the vibration directions of the unsprung part (wheel 10) as described later. In this case, it is sufficient to satisfy only such a condition that one of the sin phase detection coil 45 and the cos phase detection coil 46 is arranged so that a vehicle vertical direction component of the arrangement of the one of the sin phase detection coil 45 and the cos phase detection coil 46 with respect to the resolver rotor 42 is more than a vehicle vertical direction component of the arrangement of another of the sin phase detection coil 45 and the cos phase detection coil 46 with respect to the resolver rotor 42, and the another of the sin phase detection coil 45 and the cos phase detection coil 46 is arranged so that a vehicle longitudinal direction component of the arrangement of the another of the sin phase detection coil 45 and the cos phase detection coil 46 with respect to the resolver rotor 42 is more than a vehicle longitudinal direction component of the arrangement of the one of the sin phase detection coil 45 and the cos phase detection coil 46 with respect to the resolver rotor 42. For example, the sin phase detection coil 45 and the cos phase detection coil 46 may be arranged in an obliquely vertical direction with respect to the resolver rotor 42 as long as the above-mentioned condition is satisfied. Note that, if the vibration directions of the unsprung part (wheel 10) do not need to be discriminated between, the above-mentioned condition is not necessary.

When a rotational angle of the resolver rotor 42 (an actual angle of the rotation from a reference position relative to the resolver stator 43) is denoted by θ, and the excitation signal supplied to the excitation coil 44 is denoted by sin(ωt), a sin phase detection voltage Ea, which is the voltage value of the sin phase detection signal output from the sin phase detection coil 45, and a cos phase detection voltage Eb, which is the voltage value of the cos phase detection signal output from the cos phase detection coil 46, are respectively represented by Expressions (1) and (2). Note that, for the sake of simplicity of description herein, the voltage amplitudes of the respective detection signals are set to 1.

$$Ea = \sin\theta * \sin(\omega t) \quad (1)$$

$$Eb = \cos\theta * \sin(\omega t) \quad (2)$$

The resolver 41 outputs the sin phase detection signal and the cos phase detection signal to the resolver calculator 50.

The resolver calculator 50 includes a first multiplier 51, a second multiplier 52, a subtractor 53, a synchronous detector 54, a controller 55, a cos table 56, a sin table 57, and an excitation signal generator 58. In the resolver calculator 50, an output angle φ, which is an output value of the controller 55, is considered as the rotational angle detected by the rotational angle sensor 40, namely, a sensor value, and is transmitted to the motor control part 120 and the unsprung state detection part 140 of the ECU 100. This resolver calculator 50 uses a so-called tracking loop to calculate the output angle φ (detected angle φ) so that the output angle φ matches the actual rotational angle θ.

The excitation signal generator 58 outputs an AC voltage signal for causing the excitation coil 44 of the resolver 41 to generate the excitation signal (sin(ωt)). This AC voltage signal is supplied to the excitation coil 44 in a non-contact manner via the transmission coil, the reception coil, and the like, which are not shown. Note that, for the sake of simplicity of description, the voltage amplitude of the excitation signal is set to 1. Moreover, it is assumed that a phase lag of the excitation signal does not occur.

The cos table 56 inputs thereto the output angle φ output from the controller 55, calculates a cosine value cos φ of the output angle φ, and outputs the calculation result to the first multiplier 51. The first multiplier 51 outputs a result (sin θ*sin(ωt)*cos φ) of multiplying the sin phase detection voltage Ea by cos φ to the subtractor 53. Similarly, the sin table 57 inputs thereto the output angle φ output from the controller 55, calculates a sine value sin φ of the output angle φ, and outputs the calculation result to the second multiplier 52. The second multiplier 52 outputs a result (cos θ*sin(ωt) *sin φ) of multiplying the cos phase detection voltage Eb by sin φ) to the subtractor 53. The subtractor 53 subtracts the output value of the second multiplier 52 from the output value of the first multiplier 51. A subtraction value Ec, which is an output value of this subtractor 53, is represented by Expression (3).

$$Ec = (\sin\theta * \cos\varphi - \cos\theta * \sin\varphi) * \sin(\omega t) \quad (3)$$
$$= \sin(\theta - \varphi) * \sin(\omega t)$$

The subtractor 53 outputs the subtraction value Ec to the synchronous detector 54. The synchronous detector 54 uses a synchronous clock generated from the excitation signal to synchronously detect the subtraction value Ec. As a result, a control deviation $\sin(\theta-\varphi)$ acquired by removing $\sin(\omega t)$ from the subtraction value Ec is calculated. This control deviation $\sin(\theta-\varphi)$ is output to the controller 55. The controller 55 controls the output angle φ so that the input control deviation $\sin(\theta-\varphi)$ is zero. This tracking loop calculates the output angle φ so that φ=θ, in other words, the output angle φ, which is the detection value of the rotational angle sensor 40, follows the actual rotational angle θ of the resolver rotor 42. Note that a transfer function G(s) of the controller 55 can be represented by, for example, Expression (4).

$$G(s)=Kg/((\tau_1 s+1)(\tau_2 s+1)) \quad (4)$$

where Kg is a gain constant, $\tau_1$ and $\tau_2$ are respectively time constants, and s is a Laplacian operator.

<Principle of Travel Road Surface Determination by Using Rotational Angle Sensor>

Figure 4:
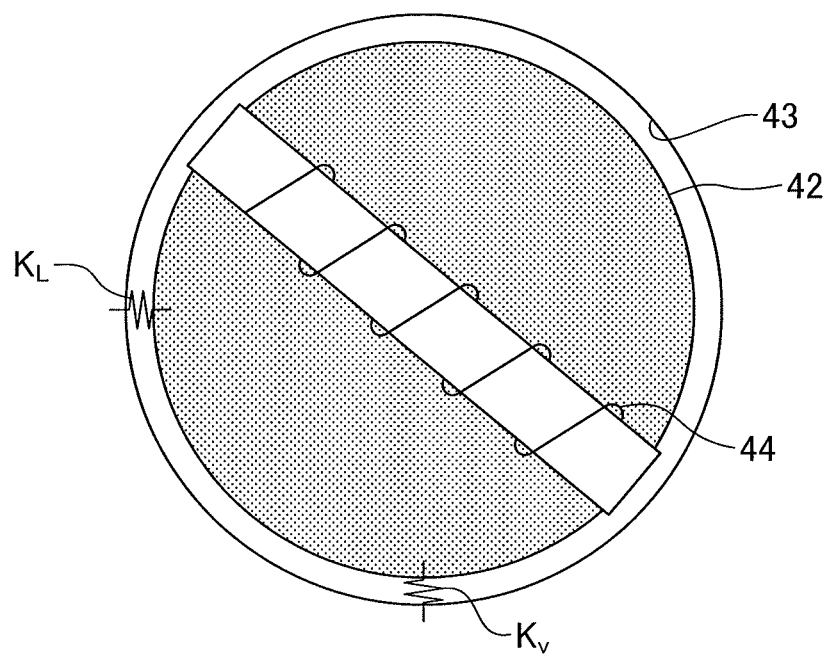
FIG. 4 is an explanatory diagram illustrating a spring constant of a resolver.

The detected angle φ to be output from the rotational angle sensor 40 is calculated by using the sin phase detection voltage Ea and the cos phase detection voltage Eb. Moreover, the sin phase detection voltage Ea is determined based on the relative positional relationship between the excitation coil 44 and the sin phase detection coil 45, and the cos phase detection voltage Eb is determined based on the relative positional relationship between the excitation coil 44 and the cos phase detection coil 46. Thus, the resolver 41 is manufactured so that the relative position of the rotational axis of the resolver rotor 42 with respect to the resolver stator 43 is maintained to be constant, and the separation between the outer periphery of the resolver rotor 42 and an inner periphery of the resolver stator 43 is maintained to be constant. However, in general, a component of a mechanical product does not have an infinite rigidity, and as illustrated in FIG. 4, has a finite spring constant KL and a finite spring constant KV.

In such a structure that the motors 30 are assembled to the unsprung parts as in the vehicle 1 of driving the in-wheel motors for travel, an external force is input from the road surface not only to the motor 30 but also to the resolver 41 of the rotational angle sensor 40. In this case, such a case is conceivable that the external force input from the road surface directly acts on the rotational angle sensor 40, and the relative position between the resolver rotor 42 and the resolver stator 43 of the rotational angle sensor 40 changes, and such a case is also conceivable that the change in the relative position between the rotor and the stator of the motor 30 is transmitted to the rotational angle sensor 40, and the relative position between the resolver rotor 42 and the resolver stator 43 of the rotational angle sensor 40 changes. As a result, the relative positional relationship between the resolver rotor 42 and the resolver stator 43, namely, the distance between the excitation coil 44 and the sin phase detection coil 45 and the distance between the excitation coil 44 and the cos phase detection coil 46 change depending on the magnitude of the input external force. In general, such a design as to ensure rigidity of peripheral components is employed so that these distances change as less as possible, in other words, the rotational center axis of the resolver rotor 42 maintains a constant position with respect to the resolver stator 43, but in reality, it is difficult to completely maintain the distances to be constant.

Figure 5:
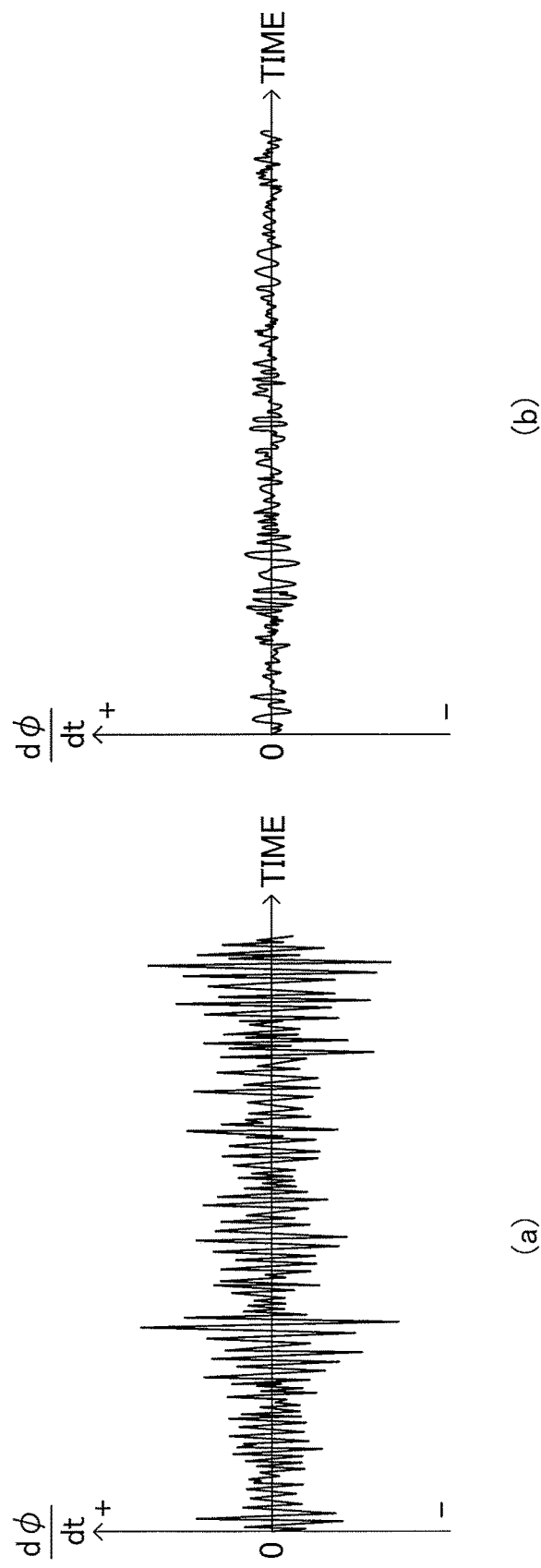
FIG. 5 are graphs showing a transition of a derivative of a detected angle output by the rotational angle sensor.

Therefore, the detected angle φ output by the rotational angle sensor 40 includes a variation component that is not caused by the change in the rotational angle of the motor 30 during the travel of the vehicle 1. FIGS. 5(a) and 5(b) respectively show a transition of a derivative of the detected angle φ at the time when the vehicle 1 is traveling at a constant speed in order to show the variation in the detection value of the rotational angle sensor 40. FIG. 5(a) shows experimental data at the time when the vehicle 1 is traveling on a rough road and FIG. 5(b) shows experimental data at the time when the vehicle 1 is traveling on a smooth road both at the same scale. As appreciated from the graphs, the variation component (variation component that is not caused by the change in the rotational angle of the motor 30) in the detected angle φ output by the rotational angle sensor 40 is larger when the vehicle 1 is traveling on the rough road compared with when the vehicle 1 is traveling on the smooth road.

According to this embodiment, the variation in the detected angle φ, which is not caused by the change in the rotational angle of the motor 30, is detected by recognizing this phenomenon, and a magnitude of this variation is acquired as an index of a magnitude of a force acting on the vehicle 1 from the outside. Then, the state of the road surface on which the vehicle 1 is traveling is determined based on this index. In other words, as the variation (vibration) in the sensor value, which is not caused by the change in the rotational angle of the motor 30, increases, the force input from the road surface to the unsprung part (wheel) is considered to be larger, and it is determined whether the travel road of the vehicle 1 is a rough road or a smooth road based on the magnitude of this force.

Here, a reason for the variation generated in the detected angle φ of the rotational angle sensor 40 is discussed. For example, in the resolver 41 illustrated in FIG. 2, a case is considered in which the resolver rotor 42 moves in the vehicle vertical direction relatively to the resolver stator 43, and the excitation coil 44 comes to be closer to the sin phase detection coil 45. In this case, the sin phase detection voltage Ea and the cos phase detection voltage Eb are represented by Expressions (5) and (6).

$$Ea=K*\sin\theta*\sin(\omega t) \quad (5)$$

$$Eb=\cos\theta*\sin(\omega t) \quad (6)$$

where K is a coefficient inversely proportional to the square of a distance between the excitation coil 44 and the sin phase detection coil 45 (because intensity of the electromagnetic wave is inversely proportional to the square of the distance).

In this case, the subtraction value Ec, which is the output of the subtractor 53 of the resolver calculator 50, is represented by Expression (7).

$$Ec = (K*\sin\theta*\cos\varphi - \cos\theta*\sin\varphi)*\sin(\omega t) \quad (7)$$
$$= \{(K-1)*\sin\theta*\cos\varphi + \sin(\theta-\varphi)\}*\sin(\omega t)$$

Therefore, even if the controller 55 calculates ϕ so that the subtraction value Ec is zero, the detected angle ϕ output by the controller 55 is calculated as a value different from θ due to a term depending on (K−1).

In the example illustrated in FIG. 2, in order to describe the principle of the resolver 41, only one sin phase detection coil 45 and one cos phase detection coil 46 are illustrated, but in reality, for example, as illustrated in FIG. 3, there is employed a structure in which the sin phase detection coils 45 are arranged at the positions opposed to each other and the cos phase detection coils 46 are arranged at the positions opposed to each other, to thereby reduce the influence of the variation in the distance. Even in this structure, an output increase (increase in the voltage amplitude value) of the detection coil 45 (46) on a side approaching the excitation coil 44 is larger than an output decrease of the detection coil 45 (46) on a side departing from the excitation coil 44, and the variation in the distance affects the detected angle ϕ of the resolver calculator 50.

The unsprung state detection part 140 included in the ECU 100 uses this phenomenon to detect the vibration state of the unsprung part caused by the input from the outside based on the detected angle ϕ output by the rotational angle sensor 40 or the detection voltages Ea and Eb output by the resolver 41, and determines the state of the road surface on which the vehicle 1 is traveling based on this detection result. This unsprung state detection part 140 corresponds to a vehicle state detection device according to the present invention.

Travel Road Surface Determination Processing 1

Figure 6:
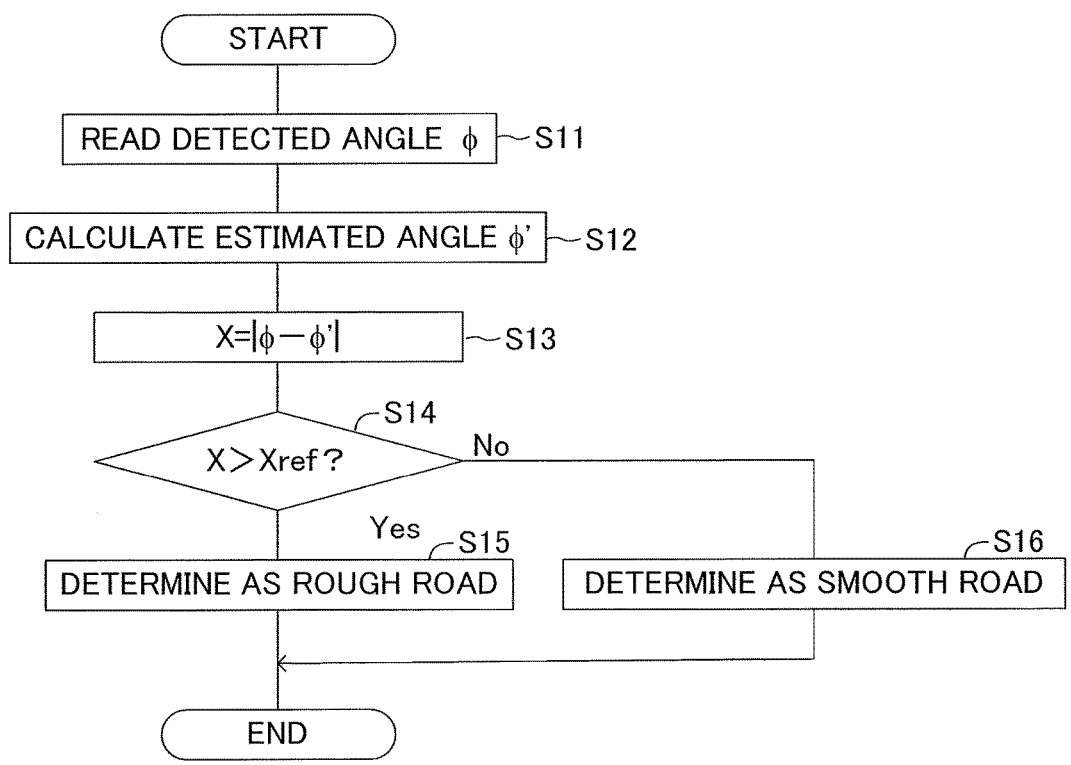
FIG. 6 is a flowchart illustrating a first travel road surface determination routine.

A description is now given of examples of travel road surface determination processing executed by the unsprung state detection part 140. FIG. 6 illustrates a first travel road surface determination routine executed by the unsprung state detection part 140 of the ECU 100. The first travel road surface determination routine is repeatedly executed at a predetermined short calculation cycle while the vehicle 1 is traveling. Thus, the unsprung state detection part 140 reads the wheel speed detected by the wheel speed sensor 63 at a predetermined cycle while the ignition switch is turned on, and executes the first travel road surface determination routine when the wheel speed is more than a travel determination value. Moreover, the unsprung state detection part 140 executes the first travel road surface determination routine for each of the wheels 10.

When this routine starts, in the step S11, the unsprung state detection part 140 reads the detected angle ϕ output by the rotational angle sensor 40. Then, in the step S12, the unsprung state detection part 140 calculates an estimated angle ϕ', which is an estimated value of the motor rotational angle.

When the estimated angle ϕ' is calculated, for example, a value acquired by adding, to a detected angle $\phi_{n-1}$ of the rotational angle sensor 40 read a predetermined time period before (herein, a description is given on the assumption that the predetermined time period is one calculation cycle), a unit time rotation estimated value Δϕ, which is an angle by which the motor 30 is estimated to rotate in the predetermined time period (one calculation cycle) is used as the estimated angle ϕ'(=$\phi_{n-1}$+Δϕ). The unit time rotation estimated value Δϕ can be calculated (estimated) based on the required braking/driving force calculated by the braking/driving force calculation part 110 one calculation cycle before and the wheel speed detected one calculation cycle before. For example, when the required braking/driving force is known, a change amount in the wheel speed per calculation cycle can be estimated based on a vehicle body mass, tire characteristics, and suspension characteristics. Thus, based on the wheel speed one calculation cycle before and the wheel speed change amount which has changed in one calculation cycle, the unit time rotation estimated value Δϕ, which is the estimated angle of the rotation of the motor 30 in one calculation cycle, can be calculated. The unsprung state detection part 140 stores association data such as a map for deriving the unit time rotation estimated value Δϕ from the required braking/driving force and the wheel speed in a nonvolatile memory (not shown), and refers to the association data to calculate the unit time rotation estimated value Δϕ. Then, the unsprung state detection part 140 adds the unit time rotation estimated value Δϕ to the detected angle $\phi_{n-1}$ read one calculation cycle before, to thereby calculate the estimated angle ϕ'.

Then, in the step S13, the unsprung state detection part 140 calculates a variation amount X (=|ϕ−ϕ'|), which is a magnitude of a difference between the detected angle ϕ and the estimated angle ϕ'. When the relative position of the rotational center axis of the resolver rotor 42 does not change with respect to the resolver stator 43, the variation in the detected angle ϕ, which is not caused by the change in the rotational angle of the motor 30, is small (at a level of a calculation error). However, when the motor 30 or the resolver 41 is vibrated by the force input from the road surface to the unsprung part, the relative position of the rotational center axis of the resolver rotor 42 radially changes, and the variation in the detected angle ϕ, which is not caused by the change in the rotational angle of the motor 30, increases. Therefore, the variation amount X is a value representing the magnitude of the variation in the detected angle ϕ, which is not caused by the change in the rotational angle of the motor 30. The variation amount X is generated by the force input from the road surface to the unsprung part, and increases as the force input from the road surface increases. The variation amount X can thus be used as an index representing a degree of the magnitude of the force acting on the unsprung part from the road surface.

In the step S14, the unsprung state detection part 140 compares the variation amount X and a road surface determination threshold Xref with each other, and determines whether or not the variation amount X is more than the road surface determination threshold Xref. The road surface determination threshold Xref is a threshold for determining whether the travel road on which the vehicle 1 is traveling is a smooth road (flat road) having a good road surface state or a rough road (uneven road) having a bad road surface state, and is set in advance. When the variation amount X is more than the road surface determination threshold Xref, in the step S15, the unsprung state detection part 140 determines that the travel road is a rough road, and when the variation amount X is equal to or less than the road surface determination threshold Xref, in the step S16, the unsprung state detection part 140 determines that the travel road is a smooth road.

When the unsprung state detection part 140 has made the travel road surface determination in the step S15 or S16, the unsprung state detection part 140 once finishes this routine. Then, the unsprung state detection part 140 repeatedly executes this routine at the predetermined calculation cycle. In this case, each time the unsprung state detection part 140 determines the road surface state, the unsprung state detection part 140 successively outputs the determination result to a suspension ECU (not shown). The suspension ECU changes a damping force of the shock absorber based on the road surface determination result. As a result, the damping force for suppressing a vibration of the vehicle body in the vehicle vertical direction can be appropriately generated. Note that the road surface determination result output by the unsprung state detection part 140 corresponds to the variation amount X at a moment (at a calculation timing), and is not a constant determination result. However, a final damping force may be set on the suspension ECU side through processing of input determination result data (for example, calculating a ratio of the rough road determination).

The vehicle state detection device according to this embodiment described above uses the rotational angle sensor 40 for detecting the rotational angle of the motor 30 installed on the unsprung part, to thereby detect the variation amount X of the detected angle φ, which is not caused by the change in the rotational angle of the motor 30, and acquires this variation amount X as the index of the magnitude of the force input from the road surface to the unsprung part. Thus, without installing a dedicated sensor for detecting the external force such as an acceleration sensor, the magnitude of the force acting on the vehicle 1 (unsprung part) from the outside can be detected. Then, based on the variation amount X, the road surface state of the travel road can be determined. Thus, the cost, the weight, and the size can be reduced. Moreover, the rotational angle sensor for the motor 30 for driving the wheel, namely, the in-wheel motor, is used, and the acquisition of the change in the relative position between the resolver rotor 42 and the resolver stator 43 caused by the input from the outside (road surface) is thus facilitated. As a result, the external force input from the road surface to the unsprung part can be appropriately detected, and the road surface state can thus be appropriately determined. Moreover, the resolver rotational angle sensor is used as the rotational angle sensor 40, and the detection of the variation in the detected angle φ, which is not caused by the change in the rotational angle of the motor 30, is thus facilitated.

Moreover, according to this embodiment, the road surface state is determined by comparing the variation amount X and the road surface determination threshold Xref with each other. However, for example, through acquisition of a relationship between the magnitude of the variation amount X and an input acceleration (corresponding to the magnitude of the force) of the unsprung part by experiments or the like to store the relationship data in the ECU 100, such a configuration can be employed that acceleration detection means for detecting the input acceleration of the unsprung part based on the variation amount X is mounted. In this case, the unsprung state detection part 140 may sequentially output the input acceleration of the unsprung part to the suspension ECU (not shown). The suspension ECU changes the damping force of the shock absorber based on the input acceleration. As a result, the damping force for suppressing the vibration of the vehicle body in the vehicle vertical direction can be more appropriately generated.

Modified Example: Travel Road Surface Determination Processing 2

Figure 7:
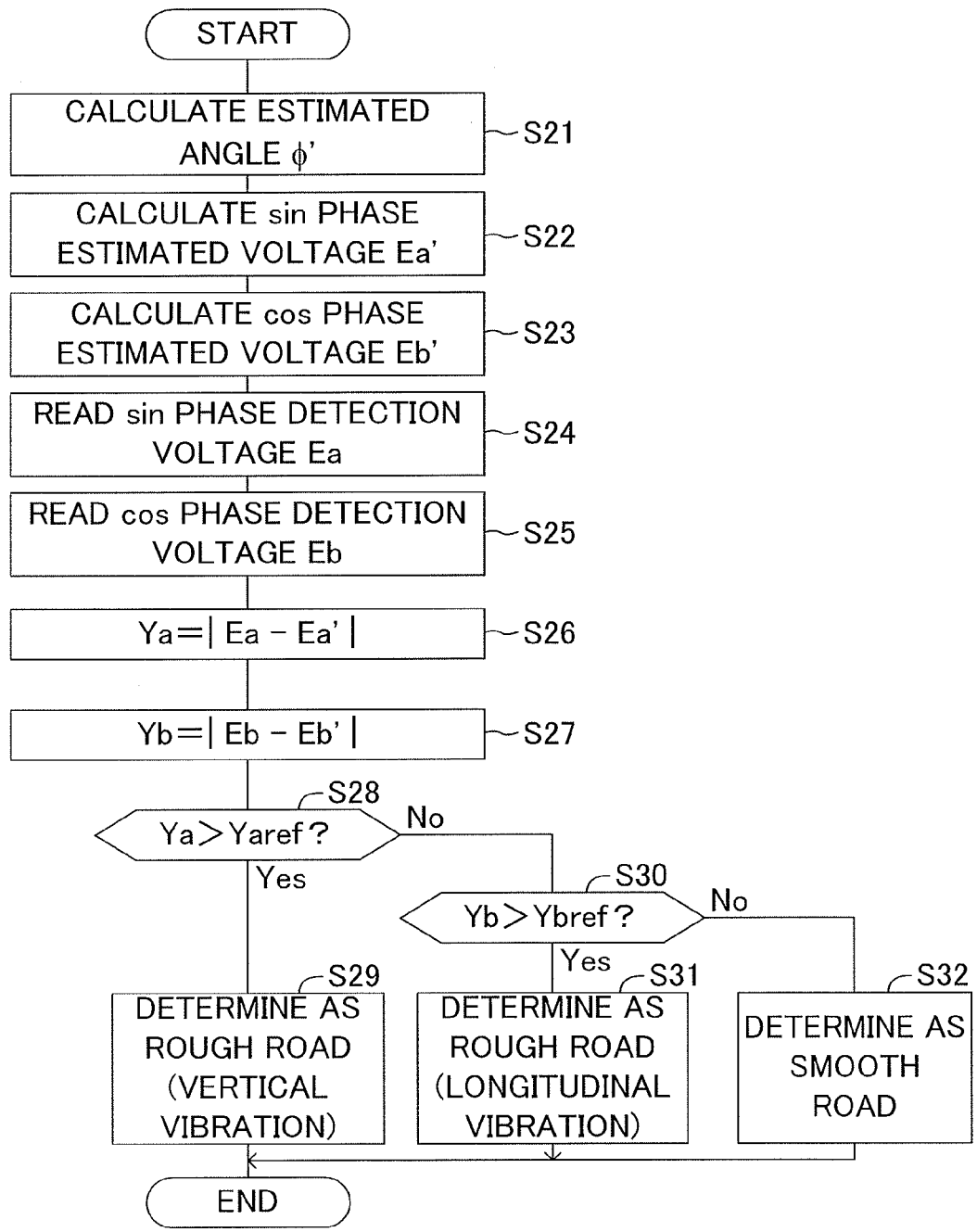
FIG. 7 is a flowchart illustrating a second travel road surface determination routine.

A description is now given of second travel road surface determination processing as a modified example of the travel road surface determination processing executed by the unsprung state detection part 140. FIG. 7 illustrates a second travel road surface determination routine executed by the unsprung state detection part 140 of the ECU 100. The second travel road surface determination routine is executed independently for each of the wheels 10 at the same timing as the timing of the above-mentioned first travel road surface determination routine.

For the execution of the second travel road surface determination processing, it is necessary to satisfy such a condition that one of the sin phase detection coil 45 and the cos phase detection coil 46 of the resolver 41 is arranged so that a vehicle vertical direction component of the arrangement of the one of the sin phase detection coil 45 and the cos phase detection coil 46 with respect to the resolver rotor 42 is more than a vehicle vertical direction component of the arrangement of another of the sin phase detection coil 45 and the cos phase detection coil 46 with respect to the resolver rotor 42, and the cos phase detection coil 46 is arranged so that a vehicle longitudinal direction component of the arrangement of the another of the sin phase detection coil 45 and the cos phase detection coil 46 with respect to the resolver rotor 42 is more than a vehicle longitudinal direction component of the arrangement of the one of the sin phase detection coil 45 and the cos phase detection coil 46 with respect to the resolver rotor 42. On this occasion, a description is given on the assumption that, as illustrated in FIG. 3, the sin phase detection coil 45 is arranged so that the vehicle vertical direction component of the arrangement of the sin phase detection coil 45 is more than the vehicle vertical direction component of the arrangement of the cos phase detection coil 46 (the cos phase detection coil 46 is arranged so that the vehicle longitudinal direction component of the arrangement of the cos phase detection coil 46 is more than the vehicle longitudinal direction component of the arrangement of the sin phase detection coil 45).

When this routine starts, in the step S21, the unsprung state detection part 140 calculates the estimated angle φ'. When this estimated angle φ' is calculated, the same processing as the processing executed in the step S12 of the first travel road surface determination routine is executed. Thus, also in this second travel road surface determination routine, the unsprung state detection part 140 reads the detected angle φ output by the rotational angle sensor 40, the required braking/driving force calculated by the braking/driving force calculation part 110, and the wheel speed output by the wheel speed sensor 63 at a predetermined calculation cycle, and calculates the estimated angle φ' based on those values. Then, in the step S22, the unsprung state detection part 140 calculates, based on the estimated angle φ', a voltage value (referred to as sin phase estimated voltage Ea') to be output by the sin phase detection coil 45 when the rotational angle position of the resolver rotor 42 reaches this estimated angle φ'. This calculation can be carried out by assigning φ' to the value of θ in the Expression (1) described above and assigning ωt of the excitation signal output by the excitation signal generator 58 to the value of ωt in the Expression (1) described above. Then, in the step S23, the unsprung state detection part 140 calculates, based on the estimated angle φ', a voltage value (referred to as cos phase estimated voltage Eb') to be output by the cos phase detection coil 46 when the rotational angle position of the resolver rotor 42 reaches this estimated angle φ'. In this case, the Expression (2) described above is used to carry out the calculation as in the step S22.

Then, in the step S24, the unsprung state detection part 140 reads the sin phase detection voltage Ea, which is the output voltage of the sin phase detection coil 45 of the resolver 41, and in the step S25, reads the cos phase detection voltage Eb, which is the output voltage of the cos phase detection coil 46 of the resolver 41. Then, in the step S26, the unsprung state detection part 140 calculates a variation amount Ya (=|Ea−Ea'|), which is a magnitude of a difference between the sin phase detection voltage Ea and the sin phase estimated voltage Ea', and in the step S27, calculates a variation amount Yb (=|Eb−Eb'|), which is a magnitude of a difference between the cos phase detection voltage Eb and the cos phase estimated voltage Eb'.

When the relative position of the rotational center axis of the resolver rotor 42 is not changed with respect to the resolver stator 43, the variations in the detection voltages Ea and Eb, which are not caused by the change in the rotational angle of the motor 30, are small (at a level of a calculation error). Therefore, the output voltages Ea and Eb of the detection coils 45 and 46 are values that are approximately the same as the estimated voltages Ea' and Eb'. On the other hand, when the motor 30 or the resolver 41 is vibrated by the force input from the road surface to the unsprung part, the relative position of the rotational center axis of the resolver rotor 42 changes in the radial direction. On this occasion, when the force input to the unsprung part is a force in the vehicle vertical direction, the resolver rotor 42 vibrates in the vehicle vertical direction with respect to the resolver stator 43. In this case, a large amount of the variation components that are not caused by the change in the rotational angle of the motor 30 are included in the sin phase detection voltage Ea output by the sin phase detection coil 45 arranged on the resolver rotor 42 in the vehicle vertical direction. Moreover, when the force input to the unsprung part is a force in the vehicle longitudinal direction, the resolver rotor 42 vibrates in the vehicle longitudinal direction with respect to the resolver stator 43. In this case, a large amount of the variation components that are not caused by the change in the rotational angle of the motor 30 are included in the cos phase detection voltage Eb output by the cos phase detection coil 46 arranged on the resolver rotor 42 in the vehicle longitudinal direction. Therefore, the variation amount Ya can be used as the index representing the degree of the magnitude of the force acting on the unsprung part from the road surface in the vehicle vertical direction. Moreover, the variation amount Yb can be used as the index representing the degree of the magnitude of the force acting on the unsprung part from the road surface in the vehicle longitudinal direction. The vehicle vertical direction is simply hereinafter referred to as a vertical direction, and the vehicle longitudinal direction is simply hereinafter referred to as a longitudinal direction.

In the step S28, the unsprung state detection part 140 compares the variation amount Ya and a vertical direction determination threshold Yaref with each other, and determines whether or not the variation amount Ya is more than the vertical direction determination threshold Yaref. The vertical direction determination threshold Yaref is a threshold for determining whether or not the travel road on which the vehicle 1 is traveling is a road on which the unsprung part tends to vibrate in the vertical direction, and is set in advance. When the variation amount Ya is more than the vertical direction determination threshold Yaref, in the step S29, the unsprung state detection part 140 determines that the travel road on which the vehicle 1 is traveling is a rough road that generates the vehicle vibration in the vertical direction.

On the other hand, when the variation amount Ya is equal to or less than the vertical direction determination threshold Yaref, in the step S30, the unsprung state detection part 140 compares the variation amount Yb and a longitudinal direction determination threshold Ybref with each other, and determines whether or not the variation amount Yb is more than the longitudinal direction determination threshold Ybref. The longitudinal direction determination threshold Ybref is a threshold for determining whether or not the travel road on which the vehicle 1 is traveling is a road on which the unsprung part tends to vibrate in the longitudinal direction, and is set in advance. When the variation amount Yb is more than the longitudinal direction determination threshold Ybref, in the step S31, the unsprung state detection part 140 determines that the travel road on which the vehicle 1 is traveling is a rough road that generates the vehicle vibration in the longitudinal direction. Moreover, when the variation amount Yb is equal to or less than the longitudinal direction determination threshold Ybref, in the step S32, the unsprung state detection part 140 determines that the travel road on which the vehicle 1 is traveling is a smooth road.

When the travel road surface determination is completed, the unsprung state detection part 140 once finishes this routine. Then, the unsprung state detection part 140 repeatedly executes this routine at the predetermined calculation cycle. Each time the unsprung state detection part 140 determines the road surface state, the unsprung state detection part 140 successively outputs the determination result to the suspension ECU (not shown). The suspension ECU changes the damping force of the shock absorber based on the road surface determination result. In this case, the suspension ECU can determine whether the vibration acting on the unsprung part is a vibration in the vertical direction or a vibration in the longitudinal direction, and can thus exclude the case in which the vibration in the longitudinal direction is detected to control the damping force of the shock absorber when the vibration in the vertical direction is detected. Thus, damping force control can be carried out more appropriately.

Note that, in this example, when the variation amount Ya is more than the vertical direction determination threshold Yaref (Yes in S28), the travel road is determined to be a rough road that generates the vehicle vibration in the vertical direction, but the determination processing similar to the determination processing executed in the step S30 may be added between the steps S28 and S29. In the determination processing, when the determination is "Yes", the state is determined to be such a state that the unsprung part vibrates both in the vertical and lateral directions, and when the determination is "No", the processing in the step S29 is executed.

The second travel road surface determination processing described above acquires the magnitudes of the force acting on the unsprung part from the road surface in the vertical direction and the longitudinal direction, respectively, by differentiating the direction of the arrangement of the sin phase detection coil 45 and the cos phase detection coil 46 of the resolver 41 between the vertical direction and the longitudinal direction, to thereby detect the variation amounts Ya and Yb in the sin phase detection voltage Ea and the cos phase detection voltage Eb, which are not caused by the change in the rotational angle of the motor 30. As a result, in addition to the above-mentioned effect of the embodiment, there is achieved such an effect that it can be determined whether the force acting on the vehicle 1 is the force in the vertical direction or the force in the longitudinal direction. For example, through the acquisition of a relationship between the magnitude of the variation amount Ya and a vertical acceleration of the unsprung part or a relationship between the magnitude of the variation amount Yb and a longitudinal acceleration of the unsprung part by means of experiments to store the relationship data in the ECU 100, such a configuration can be employed that vertical/longitudinal acceleration detection means for detecting the vertical acceleration or the longitudinal acceleration of the unsprung part based on the variation amount Ya or the variation amount Ya during the vehicle travel is mounted.

Modified Example: Travel Road Surface Determination Processing 3

A description is now given of third travel road surface determination processing as a modified example of the travel road surface determination processing executed by the unsprung state detection part 140. In the above-mentioned second travel road surface determination processing, it is determined whether the direction of the force acting on the unsprung part (direction of the vibration of the unsprung part) is the vertical direction or the longitudinal direction (two directions on the plane orthogonal to the resolver rotor 42). However, in the third travel road surface determination processing, a force acting on the unsprung part in an axial direction of the resolver rotor 42 is detected. Thus, by executing the third travel road surface determination processing and the second travel road surface determination processing in parallel, the forces acting on the unsprung part in the three directions can be detected.

The resolver rotor 42 is arranged so that the axial direction of the resolver rotor 42 is directed in the vehicle lateral direction. Therefore, when a force acts on the unsprung part from the road surface in the vehicle lateral direction, the relative position between the resolver rotor 42 and the resolver stator 43 is changed in the axial direction of the resolver rotor 42. This change decreases both outputs of the sin phase detection signal and the cos phase detection signal compared with a case in which the relative position is not changed. The third travel road surface determination processing uses this phenomenon to detect the magnitude of the force acting in the vehicle lateral direction (hereinafter simply referred to as lateral direction). According to this embodiment, rigidity of the motor 30 is designed so that the resolver rotor 42 can be displaced in the axial direction with respect to the resolver stator 43 by an external force acting in the lateral direction.

FIG. 8 is a cross sectional view illustrating a schematic configuration of the motor 30 incorporated into the resolver 41. An axial cross sectional surface of the motor 30 is approximately left-right symmetrical, and this diagram thus illustrates only a top part of the motor. According to this embodiment, the resolver 41 is incorporated into the motor casing 31 of the motor 30, and a part of the rotor shaft 32 of the motor 30 is used as the resolver rotor 42. In other words, the excitation coil 44 of the resolver 41 is arranged so as to be fixed on a surface of a part of the rotor shaft 32, to which a magnet 33 for driving is not fixed. The detection coils 45 and 46 (the sin phase detection coil 45 and the cos phase detection coil 46) are arranged at positions opposed to this excitation coil 44 so as to be fixed to the motor casing 31. Thus, the resolver 41 is constructed by the resolver rotor 42 including the rotor shaft 32 and the excitation coil 44 as main components and the resolver stator 43 including the motor casing 31 and the detection coils 45 and 46 as main components. The resolver 41 uses this configuration to output the detection signal in correspondence to the rotational angle of the motor 30. In the diagram, reference numeral 37 denotes the stator coil.

Figure 9:
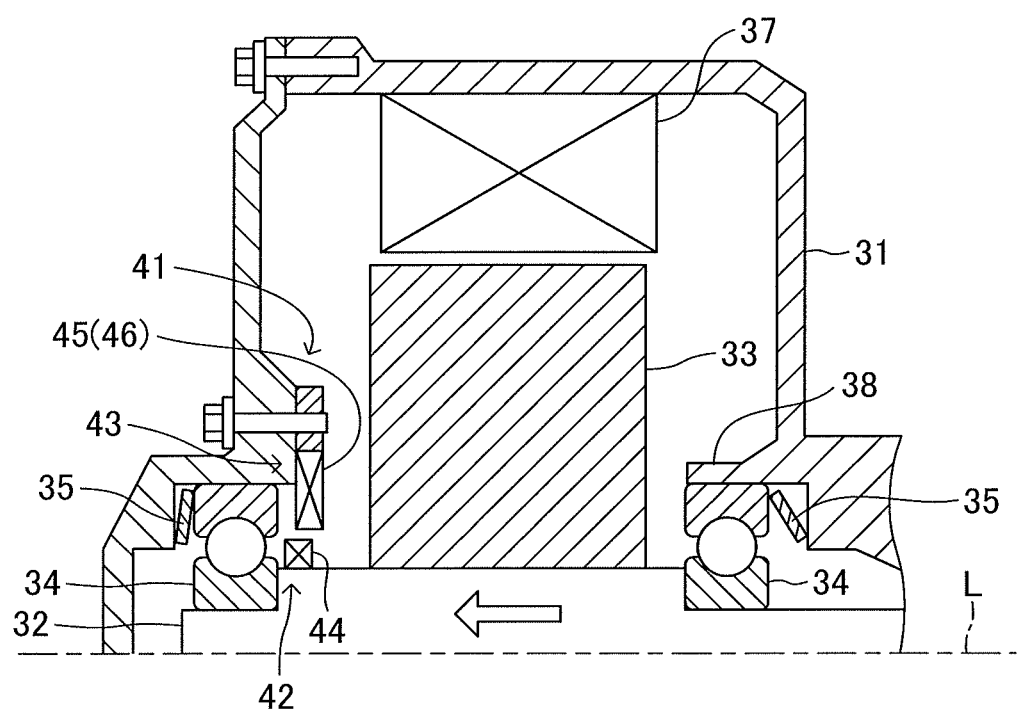
FIG. 9 is an explanatory diagram illustrating an axial displacement between a resolver rotor and a resolver stator.

The rotor shaft 32 of the motor 30 is supported by the motor casing 31 via ball bearings 34. A disc spring 35 in a ring shape is arranged coaxially with the rotor shaft 32 between each ball bearing 34 and the motor casing 31 so that the resolver rotor 42 can be axially displaced with respect to the resolver stator 43 by an external force acting in the lateral direction. This configuration enables such a design that support rigidity of the rotor shaft 32 in the axial direction can be made smaller. In a normal state, the rotor shaft 32 is positioned at a position where counterforces of the left and right disc springs 35 are balanced. Therefore, the excitation coil 44 and the detection coils 45 and 46 are positioned at positions opposed to each other (positions on the same plane orthogonal to the rotor shaft 32). Then, when an external force acts in the lateral direction, the disc springs 35 elastically deform, and the rotor shaft 32 displaces in the axial direction. Then, as illustrated in FIG. 9, the axial relative position between the resolver rotor 42 and the resolver stator 43 is changed.

Note that, in this embodiment, the two disc springs 35 are used for the adjustment of the support rigidity in the axial direction. However, other elastic bodies may be interposed, or, for example, the thickness of the motor casing 31 may be adjusted without the members for the rigidity adjustment. Moreover, as long as the resolver rotor 42 can be displaced in the axial direction with respect to the resolver stator 43, an existing motor can also be used without any modification. Moreover, in this embodiment, the resolver 41 is arranged in the motor casing 31, but the resolver 41 may be arranged outside the motor casing 31. If the resolver 41 is arranged separately from the motor 30, the support rigidity may be adjusted as described above, or support rigidity of the resolver rotor 42 may be adjusted.

Figure 10:
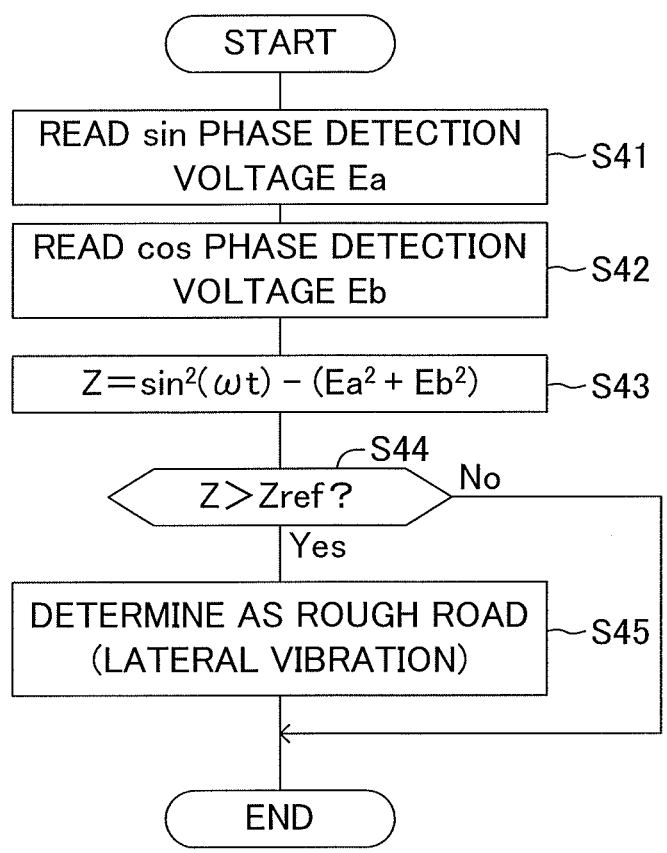
FIG. 10 is a flowchart illustrating a third travel road surface determination routine.

FIG. 10 illustrates a third travel road surface determination routine executed by the unsprung state detection part 140 of the ECU 100. The third travel road surface determination routine is executed independently for each of the wheels 10 in parallel with the above-mentioned second travel road surface determination routine.

When this routine starts, in the step S41, the unsprung state detection part 140 reads the sin phase detection voltage Ea, which is the output voltage of the sin phase detection coil 45 of the resolver 41, and in the step S42, reads the cos phase detection voltage Eb, which is the output voltage of the cos phase detection coil 46 of the resolver 41. Then, in the step S43, the unsprung state detection part 140 calculates a variation amount Z by using Expression (8).

$$Z = \sin^2(\omega t) - (Ea^2 + Eb^2) \quad (8)$$

For the calculation of this variation amount Z, the unsprung state detection part 140 reads ωt of the excitation signal output from the excitation signal generator 58, and assigns ωt to Expression (8). The sin phase detection voltage Ea is represented by $\sin \theta * \sin(\omega t)$, and the cos phase detection voltage Eb is represented by $\cos \theta * \sin(\omega t)$. Thus, the sum $(Ea^2+Eb^2)$ of the square of the voltage Ea and the square of the voltage Eb is represented by $(\sin^2 \theta + \cos^2 \theta) * \sin^2(\omega t) = \sin^2(\omega t)$. Thus, when the resolver rotor 42 is not displaced in the axial direction with respect to the resolver stator 43, the variation amount Z is basically zero. On the other hand, when the resolver rotor 42 is displaced in the axial direction with respect to the resolver stator 43, both the sin phase detection voltage Ea and the cos phase detection voltage Eb are voltage values lower than the normal values. Therefore, the variation amount Z is a value more than zero. Moreover, as the amount of the displacement of the resolver rotor 42 increases in the axial direction with respect to the resolver stator 43, the variation amount Z increases. Thus, the variation amount Z can be used as an index representing the degree of the magnitude of the force acting on the unsprung part from the road surface in the lateral direction.

In the step S44, the unsprung state detection part 140 compares the variation amount Z and a lateral direction determination threshold Zref with each other, and determines whether or not the variation amount Z is more than the lateral direction determination threshold Zref. The lateral direction determination threshold Zref is a threshold for determining whether or not the travel road on which the vehicle 1 is traveling is a road on which the unsprung part tends to vibrate in the lateral direction, and is set in advance. When the variation amount Z is more than the lateral direction determination threshold Zref, in the step S45, the unsprung state detection part 140 determines that the travel road is a rough road that generates a vehicle vibration in the lateral direction, and once finishes this routine. On the other hand, the variation amount Z is equal to or less than the lateral direction determination threshold Zref, the unsprung state detection part 140 skips the processing in the step S44, and once finishes this routine. Then, the unsprung state detection part 140 repeatedly executes this routine at the predetermined calculation cycle.

Thus, the vibration direction of the unsprung part (the direction of the force acting on the unsprung part) can be determined independently in the vertical direction, the longitudinal direction, and the lateral direction by executing the third travel road surface determination routine and the second travel road surface determination routine in parallel. In this case, through the acquisition of a relationship between the magnitude of the variation amount Z and a lateral acceleration of the unsprung part by means of experiments to store the relationship data in the ECU 100, such a configuration can be employed that lateral acceleration detection means for detecting the lateral acceleration of the unsprung part based on the variation amount Z during the vehicle travel is mounted.

<Rigidity of Support Part of Rotor>

When the vibration of the unsprung part generated by the external force input from the road surface is detected, the detection needs to be carried out while avoiding a frequency at which the vibration level is originally high. The unsprung part is high in the vibration level mainly in a neighborhood of the resonance frequency in the vertical direction and the longitudinal direction. For example, the resonance frequency of the unsprung part in the vertical direction is approximately 10 Hz, and the resonance frequency of the unsprung part in the longitudinal direction is approximately 20 Hz. If the resonance frequency of the support part for supporting the rotor shaft 32 of the motor 30 or a support part for supporting the resolver rotor 42 is included in an unsprung resonance frequency band, even when the unsprung part is vibrating in the unsprung resonance frequency band, the detection signal Ea or Eb or the detected angle φ may vary, and an accuracy of the index representing the magnitude of the external force input from the road surface to the unsprung part may decrease. According to this embodiment, the resolver rotor 42 is formed integrally with the rotor shaft 32 of the motor 30, and hence the support part for supporting the rotor shaft 32 of the motor 30 (such as a part of the motor casing 31 for supporting the ball bearing 34) is designed so as to have the resonance frequency that is different from the unsprung resonance frequencies in the vertical direction and the longitudinal direction (a value not included in neighborhood areas of the unsprung resonance frequencies). The resonance frequency of the support part increases as the rigidity of the support part increases, and conversely, the resonance frequency of the support part decreases as the rigidity of the support part decreases. Thus, the resonance frequency of the support part can be set so as not to overlap the unsprung resonance frequencies by the design of the rigidity of the support part. Note that, if the resolver 41 is arranged separately from the motor 30, the rigidity of the support part for supporting the resolver rotor 42 may be adjusted so that the resonance frequency of the support part do not overlap the neighborhood areas of the unsprung resonance frequencies. Moreover, when influence of the vibration of the rotor shaft 32 on the resolver rotor 42 is strong even in that case, the resonance frequency of the support part for supporting the motor shaft 32 of the motor 30 may be adjusted so as not to overlap the neighborhood areas of the unsprung resonance frequencies.

<Input Direction Determination Processing>

Figure 11:
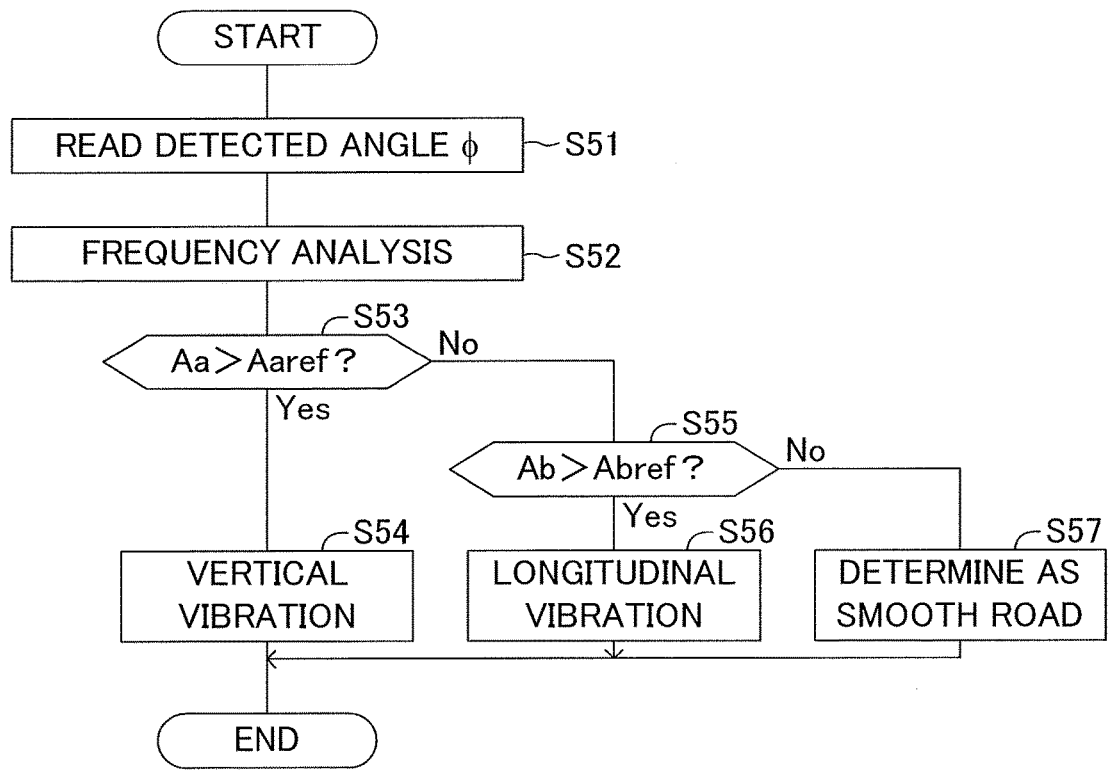
FIG. 11 is a flowchart illustrating an input direction determination routine.

A description is now given of input direction determination processing executed by the unsprung state detection part 140. FIG. 11 illustrates an input direction determination routine executed by the unsprung state detection part 140 of the ECU 100. The input direction determination routine is executed independently for each of the wheels 10 at the same timing as the timing of the execution of the above-mentioned first travel road surface determination routine. This input direction determination processing is processing of determining whether the direction of the force acting on the unsprung part is the vertical direction or the longitudinal direction, and is executed in parallel with arbitrary one of the above-mentioned travel road surface determination routines, to thereby detect the road surface state more precisely.

When it is determined whether the direction of the force acting on the unsprung part (the direction of the vibration of the unsprung part) is the vertical direction or the longitudinal direction, the support part for supporting the resolver rotor 42 is designed so that a resonance frequency in the vertical direction and a resonance frequency in the longitudinal direction are different from each other. In this embodiment, the resolver rotor 42 is arranged on the rotor shaft 32 of the motor 30, and the resonance frequencies in the vertical direction and the longitudinal direction of the motor casing 31 for supporting the rotor shaft 32 are designed so as to be different from each other. The resonance frequencies can be arbitrarily set by adjusting support rigidity.

Figure 12:
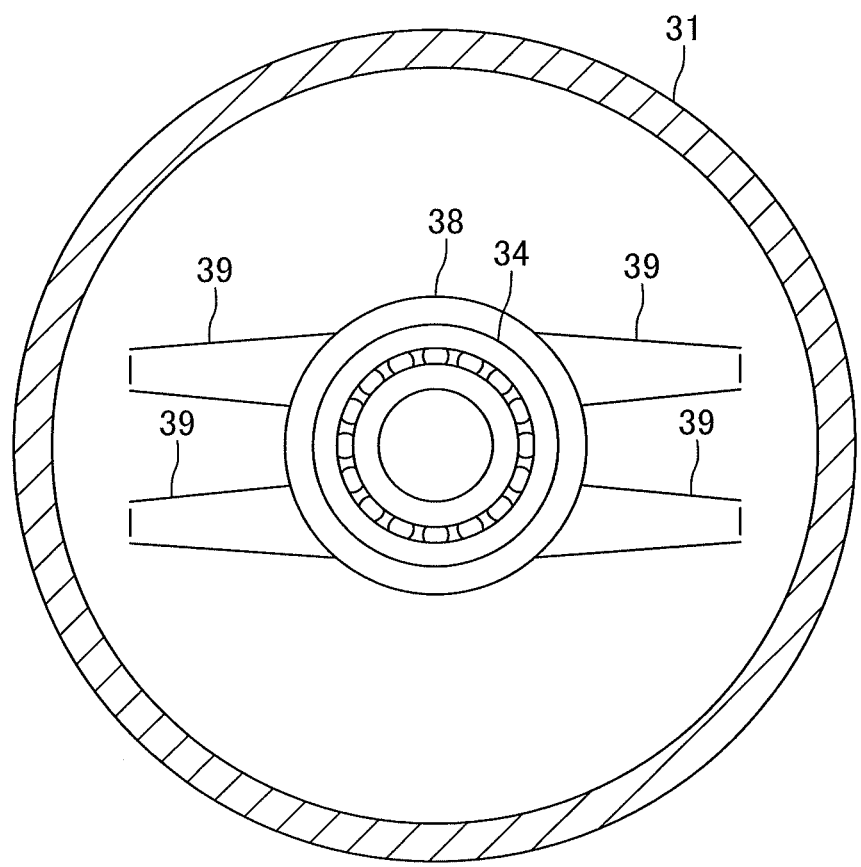
FIG. 12 is a schematic front view of an internal surface of a motor casing viewed in a direction indicated by the arrow a of FIG. 8.
Figure 13:
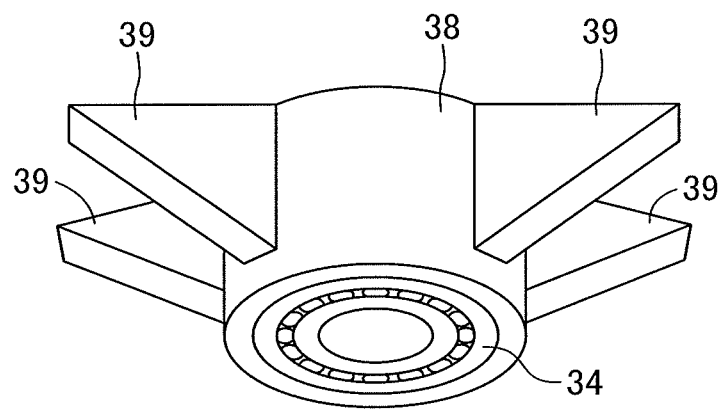
FIG. 13 is a schematic perspective view of the internal surface of the motor casing viewed in a direction indicated by the arrow b of FIG. 8.

FIG. 12 is a schematic front view of the support part when an inner surface of the motor casing 31 is viewed in a direction indicated by the arrow a of FIG. 8, and FIG. 13 is a schematic perspective view of the support part viewed in a direction indicated by the arrow b of FIG. 8. On the inner surface of the motor casing 31, a cylindrical part 38 for supporting the rotor shaft 32 via the ball bearing 34 is integrally and concentrically formed with the rotor shaft 32. Four ribs 39 are formed on an outer periphery of this cylindrical part 38. Two of the four ribs 39 are formed so as to extend from the outer periphery of the cylindrical part 38 leftward in parallel with each other. The other two ribs 39 are formed so as to extend rightward in parallel with each other. Moreover, each of the ribs 39 is formed so that a height of a wall surface integrally rising from the inner surface of the motor casing 31 decreases as the wall surface extends away from the cylindrical part 38. Those ribs 39 are not formed in the vertical direction of the cylindrical part 38. Therefore, the support rigidity of the motor casing 31 with respect to the rotor shaft 32 is higher in the lateral direction and is lower in the vertical direction. As a result, in the support part for supporting the resolver rotor 42 (the motor casing 31 including the cylindrical part 38), the resonance frequency in the lateral direction is higher than the resonance frequency in the vertical direction. Moreover, as described above, the resonance frequencies in the lateral direction and the vertical direction in the support part are set so as to be different from the unsprung resonance frequencies (for example, set to frequencies higher than the unsprung resonance frequencies).

When the input direction determination routine (FIG. 11) starts, in the step S51, the unsprung state detection part 140 reads the detected angle φ output by the rotational angle sensor 40. Then, in the step S52, the unsprung state detection part 140 carries out frequency analysis of the detected angle φ. Immediately after the start of this routine, the number of samples of the detected angle φ is small, and thus the frequency analysis cannot be carried out. Therefore, the processing in the step S51 is repeated, and after the number of samples of the detected angle φ reaches a predetermined value sufficient for the frequency analysis, the frequency analysis is carried out for the predetermined number of the latest detected angles φ. In this case, a magnitude (referred to as frequency intensity Aa) of resonance frequency components in the vertical direction of the support part of the resolver rotor 42 and a magnitude (referred to as frequency intensity Ab) of resonance frequency components in the longitudinal direction of the support part of the resolver rotor 42 are examined based on frequency characteristics of the sampled detected angles φ. For example, the frequency intensity Aa around the resonance frequency in the vertical direction of the support part of the resolver rotor 42 and the frequency intensity Ab around the resonance frequency in the longitudinal direction of the support part of the resolver rotor 42 are calculated by means of a Fast Fourier Transform (FFT) operation.

When the unsprung part is vibrating in the vertical direction, the support part of the resolver rotor 42 (the support part of the rotor shaft 32) tends to vibrate at its own resonance frequency in the vertical direction. Moreover, when the unsprung part is vibrating in the longitudinal direction, the support part of the resolver rotor 42 (the support part of the rotor shaft 32) tends to vibrate at its own resonance frequency in the longitudinal direction. The input direction determination routine uses this phenomenon to determine whether the direction of the force input to the unsprung part is the vertical direction or the longitudinal direction.

In the step S53, the unsprung state detection part 140 compares the frequency intensity Aa and a vertical direction determination threshold Aaref with each other, and determines whether or not the frequency intensity Aa is more than the vertical direction determination threshold Aaref. The vertical direction determination threshold Aaref is a threshold set in advance for determining whether the vibration direction of the unsprung part is the vertical direction or a non-vertical direction, and set to such a value as to be smaller than the frequency intensity Aa when the unsprung part is vibrating in the vertical direction, and larger than the frequency intensity Aa when the unsprung part is not vibrating in the vertical direction. When the frequency intensity Aa is more than the vertical direction determination threshold Aaref, in the step S54, the unsprung state detection part 140 determines that the force in the vertical direction is input to the unsprung part.

On the other hand, when the frequency intensity Aa is equal to or less than the vertical direction determination threshold Aaref, in the step S55, the unsprung state detection part 140 compares the frequency intensity Ab and a longitudinal direction determination threshold Abref with each other, and determines whether or not the frequency intensity Ab is more than the longitudinal direction determination threshold Abref. The longitudinal direction determination threshold Abref is a threshold set in advance for determining whether the vibration direction of the unsprung part is the longitudinal direction or a non-longitudinal direction, and set to such a value as to be smaller than the frequency intensity Ab when the unsprung part is vibrating in the longitudinal direction, and larger than the frequency intensity Ab when the unsprung part is not vibrating in the longitudinal direction. When the frequency intensity Ab is more than the longitudinal direction determination threshold Abref, in the step S56, the unsprung state detection part 140 determines that the force in the longitudinal direction is input to the unsprung part. Moreover, when the frequency intensity Ab is equal to or less than the longitudinal direction determination threshold Abref, in the step S57, the unsprung state detection part 140 determines that the travel road on which the vehicle 1 is traveling is a smooth road.

When the travel road surface determination is completed, the unsprung state detection part 140 once finishes this routine. Then, the unsprung state detection part 140 repeatedly executes this routine at a predetermined calculation cycle. Each time the unsprung state detection part 140 determines the input direction, the unsprung state detection part 140 successively outputs the determination result to the suspension ECU (not shown). Thus, the suspension ECU can recognize the vibration direction of the unsprung part, and can thus appropriately carry out the damping force control of the shock absorber. Note that the frequency intensities Aa and Ab can be used to determine absence/presence of the external input acting on the unsprung part, and thus may be acquired as indices of the magnitude of the force acting on the unsprung part.

Second Embodiment: Embodiment Using Other Motors

Figure 14:
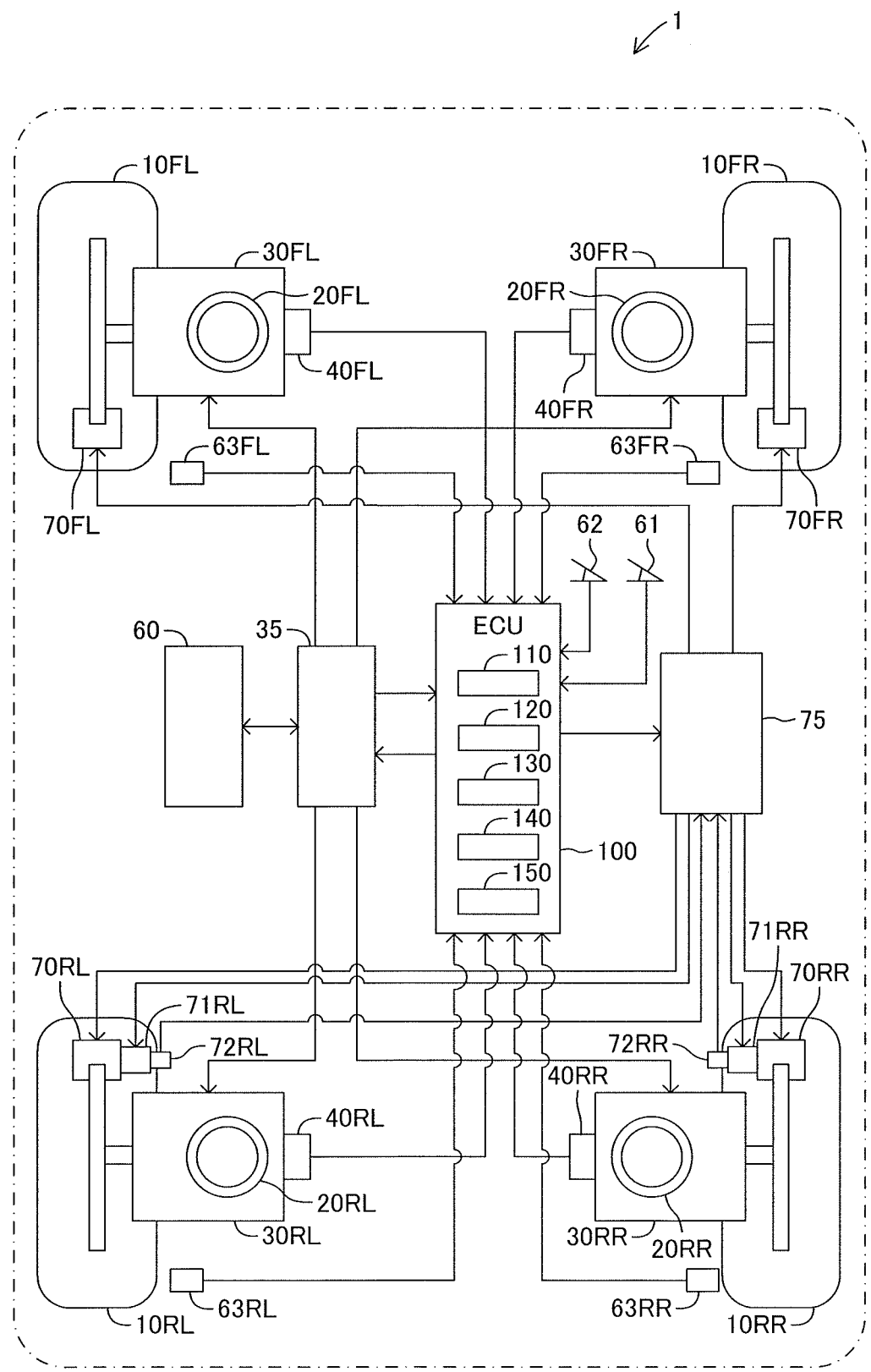
FIG. 14 is a schematic configuration diagram of a vehicle on which a vehicle state detection device according to a second embodiment of the present invention is installed.

In the above-mentioned first embodiment, the rotational angle sensor 40 for detecting the rotational angle of the motor 30 for driving the wheel 10 is used to detect the vibration state of the unsprung part (detect the force acting on the unsprung part). In contrast, in a second embodiment of the present invention, as illustrated in FIG. 14, a rotational angle sensor 72 for detecting a rotational angle of a motor 71 (referred to as EPB motor 71) used for an electric parking brake system is used to detect the vibration state of the unsprung part (the magnitude of the force acting on the unsprung part). In this electric parking brake system, EPB motors 71RL and 71RR are fixed to the unsprung parts of the rear wheels 10RL and 10RR, respectively, and brake pads (not shown) are pressed against the brake discs, respectively by the rotation of the EPB motors 71 to apply braking forces to the wheels 10, respectively. An output shaft of the EPB motor 71 is directed in the same direction as the direction of the rotational axis of the wheel 10, in other words, in the vehicle lateral direction, and a screw feed mechanism arranged between the output shaft and the brake pads converts a rotational force of the output shaft into a force (the force in the lateral direction) pressing the brake pads. The rotational angle sensor 72 for detecting a rotational angle of the EPB motor 71 is a resolver rotational angle sensor constructed by the resolver 41 and the resolver calculator 50 which are the same as the resolver 41 and the resolver calculator 50 of the first embodiment, respectively.

In the second embodiment, the ECU 100 includes an electric parking brake control part 150 (referred to as EPB control part 150). The EPB control part 150 drives the EPB motors 71 to control the electric parking brakes (referred to as EPBs) to switch between an activation state in which the EPBs are activated and a release state in which the EPBs are released based on a predetermined operation of the driver. For example, the EPB motor 71 is a blushless motor, and the ECU 100 drive-controls the EPB motor 71 based on the rotational angle detected by the rotational angle sensor 72.

The EPB motor 71 rotates only when the activation state of the parking brake is switched, and does not rotate when the vehicle 1 is traveling. Therefore, it is difficult to carry out the travel road surface determination as in the first embodiment during the travel of the vehicle 1. This is because the rotational angle of the stopping EPB motor 71 is not always the same position, and the detection voltage output by the resolver 41 of the rotational angle sensor 72 changes depending on the rotational angle (stop position).

<Stop Angle Storage Processing>

Figure 15:
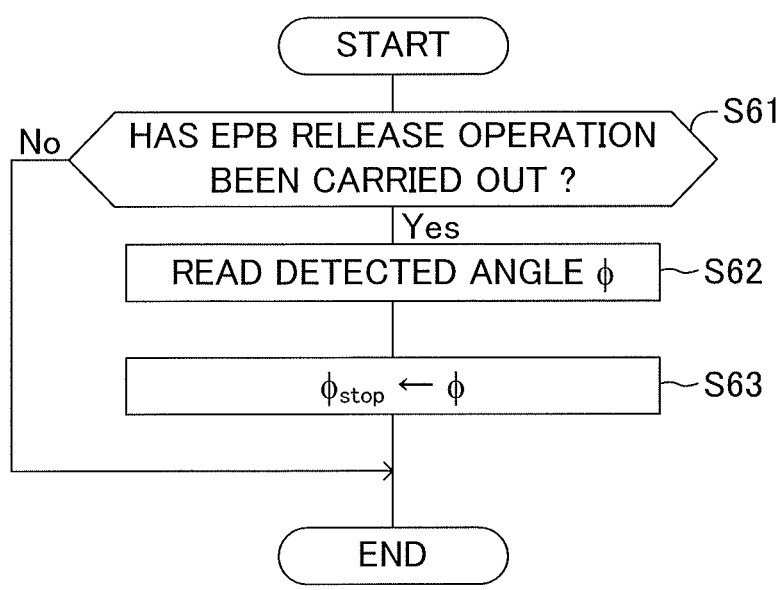
FIG. 15 is a flowchart illustrating a stop angle storage routine.

Thus, in this second embodiment, the rotational angle detected by the rotational angle sensor 72 when the EPB motor 71 stops is stored, and the stored rotational angle is used to carry out the travel road surface determination. FIG. 15 illustrates a stop angle storage routine executed by the unsprung state detection part 140. The stop angle storage routine is repeatedly executed at a predetermined short cycle while the vehicle 1 is stopped. When this routine starts, in the step S61, the unsprung state detection part 140 reads an activation signal of the EPB control part 150 to determine whether the release operation of the EPB has been carried out or not. When the driver has carried out the release operation of the EPB, the EPB control part 150 drives the motor 71 to retract the brake pads from the disc, and after the retraction has been completed, outputs an EPB release signal. When the unsprung state detection part 140 has not detected the EPB release signal, in the step S61, the unsprung state detection part 140 makes a determination, "No", and once finishes this routine. On the other hand, when the unsprung state detection part 140 has detected the EPB release signal, in the step S62, the unsprung state detection part 140 reads the detected angle φ output by the rotational angle sensor 72, and in the step S63, sets the detected angle φ as a stop angle $\phi_{stop}$ to store the stop angle $\phi_{stop}$ in a nonvolatile memory, to thereby once finish this routine ($\phi_{stop} \leftarrow \phi$). This routine is repeatedly executed, and the latest stop angle $\phi_{stop}$ is thus stored.

Travel Road Surface Determination Processing 4

Figure 16:
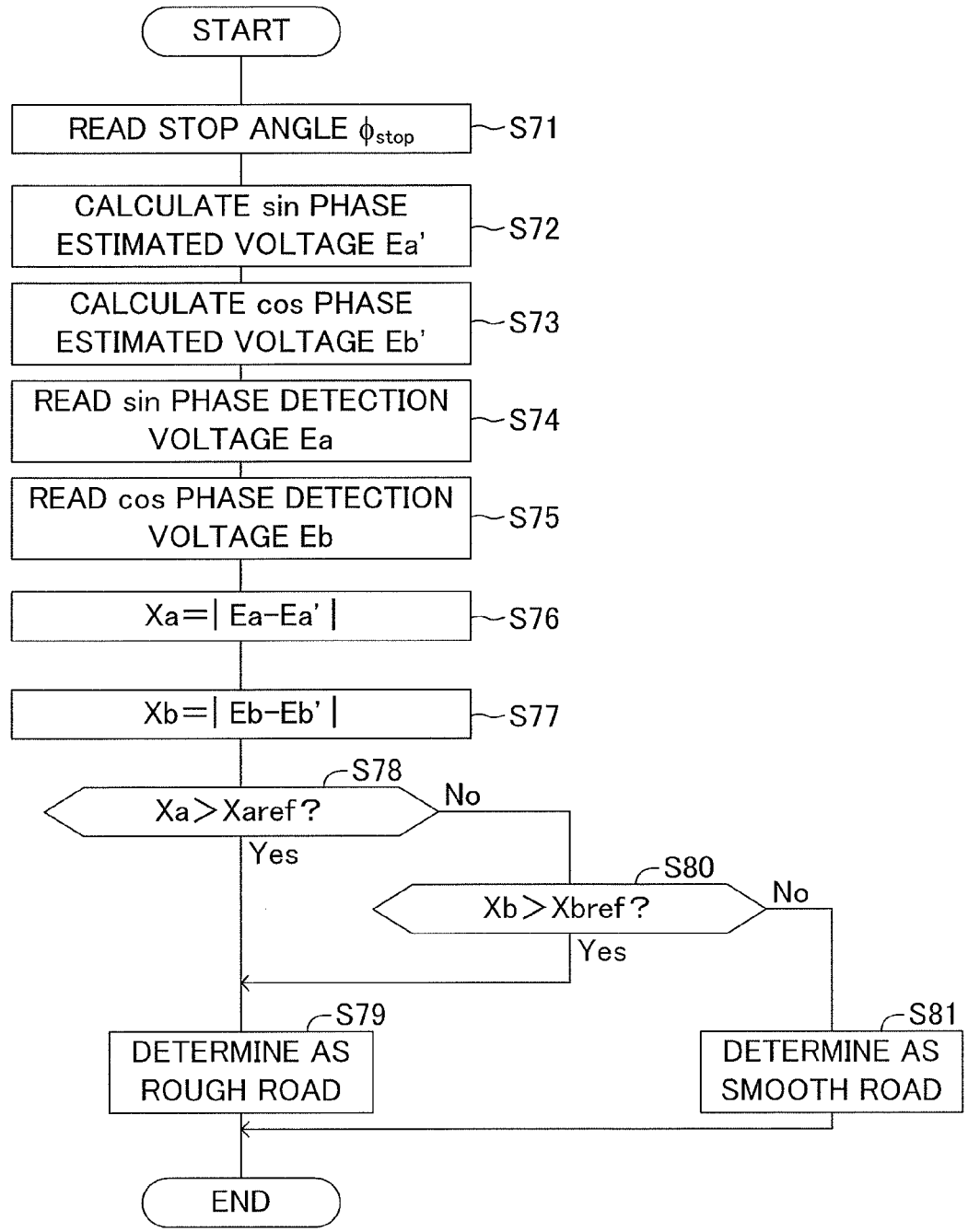
FIG. 16 is a flowchart illustrating a fourth travel road surface determination routine.

The unsprung state detection part 140 refers to this stop angle $\phi_{stop}$, and executes fourth travel road surface determination processing. FIG. 16 illustrates a fourth travel road surface determination routine executed by the unsprung state detection part 140 in the second embodiment. The fourth travel road surface determination routine is repeatedly executed at a predetermined short calculation cycle while the vehicle 1 is traveling.

When this routine starts, in the step S71, the unsprung state detection part 140 reads the stop angle $\phi_{stop}$ stored in the nonvolatile memory. Then, in the step S72, the unsprung state detection part 140 calculates, based on the stop angle $\phi_{stop}$, a voltage value (referred to as sin phase estimated voltage Ea') to be output by the sin phase detection coil 45 when the rotational angle position of the resolver rotor 42 reaches this stop angle $\phi_{stop}$. This calculation can be carried out by assigning $\phi_{stop}$ and ωt of the excitation signal output by the excitation signal generator 58 to the values of θ and ωt in Expression (1), respectively. Then, in the step S73, the unsprung state detection part 140 calculates, based on the stop angle $\phi_{stop}$, a voltage value (referred to as cos phase estimated voltage Eb') to be output by the cos phase detection coil 46 when the rotational angle position of the resolver rotor 42 reaches this stop angle $\phi_{stop}$. In this case, Expression (2) is used to carry out the calculation as in the step S72.

Then, in the step S74, the unsprung state detection part 140 reads the sin phase detection voltage Ea, which is the output voltage of the sin phase detection coil 45 of the resolver 41, and in the step S75, reads the cos phase detection voltage Eb, which is the output voltage of the cos phase detection coil 46 of the resolver 41. Then, in the step S76, the unsprung state detection part 140 calculates the variation amount Xa (=|Ea−Ea'|), which is a magnitude of a difference between the sin phase detection voltage Ea and the sin phase estimated voltage Ea', and in the step S77, calculates the variation amount Xb (=|Eb−Eb'|), which is a magnitude of a difference between the cos phase detection voltage Eb and the cos phase estimated voltage Eb'.

When the relative position of the rotational center axis of the resolver rotor 42 is not changed with respect to the resolver stator 43, the variations in the detection voltages Ea and Eb, which are not caused by the change in the rotational angle of the EPB motor 71, are small (at a level of a calculation error). Therefore, the output voltages Ea and Eb of the detection coils 45 and 46 are values that are approximately the same as the estimated voltages Ea' and Eb', respectively. On the other hand, when the EPB motor 71 or the resolver 41 is vibrated by a force input from the road surface to the unsprung part, the relative position of the rotational center axis of the resolver rotor 42 is changed in the radial direction, proportionally to the magnitude of the vibration. In this case, the detection voltages Ea and Eb include the variations in the detection voltages Ea and Eb, respectively caused by the vibration of the resolver 41, and degrees of the variations change depending on to the stop angle $\phi_{stop}$ of the motor 71. Therefore, in this routine, the influence of the stop angle $\phi_{stop}$ is eliminated by calculating a difference between the estimated voltage Ea' corresponding to the stop angle $\phi_{stop}$ and the output voltage Ea and a difference between the estimated voltage Eb' corresponding to the stop angle $\phi_{stop}$ and the output voltage Eb.

Then, in the step S78, the unsprung state detection part 140 compares the variation amount Xa and a determination threshold Xaref with each other, and determines whether or not the variation amount Xa is more than the determination threshold Xaref. When the variation amount Xa is more than the determination threshold Xaref, in the step S79, the unsprung state detection part 140 determines that the travel road on which the vehicle 1 is traveling is a rough road. On the other hand, when the variation amount Xa is equal to or less than the determination threshold Xaref, in the step S80, the unsprung state detection part 140 compares the variation amount Xb and a determination threshold Xbref with each other, and determines whether or not the variation amount Xb is more than the determination threshold Xbref. When the variation amount Xb is more than the determination threshold Xbref, in the step S79, the unsprung state detection part 140 determines that the travel road on which the vehicle 1 is traveling is a rough road. On the other hand, when the variation amount Xb is equal to or less than the determination threshold Xbref, in the step S81, the unsprung state detection part 140 determines that the travel road on which the vehicle 1 is traveling is a smooth road.

When the travel road surface determination is completed, the unsprung state detection part 140 once finishes this routine. Then, the unsprung state detection part 140 repeatedly executes this routine at a predetermined calculation cycle. Each time the unsprung state detection part 140 determines the road surface state, the unsprung state detection part 140 successively outputs the determination result to the suspension ECU (not shown). The suspension ECU changes the damping force of the shock absorber based on the road surface determination result.

The vehicle state detection device according to the second embodiment described above uses the rotational angle sensor 72 for detecting the rotational angle of the EPB motor 71 installed on the unsprung part, to thereby detect the variation amounts Xa and Xb of the detection voltages, which are not caused by the change in the rotational angle of the EPB motor 71, and acquire those variation amounts Xa and Xb as the indices of the magnitude of the force input from the road surface to the unsprung part. Thus, the same operations and effects as the operations and the effects of the first embodiment are provided. Moreover, because the stop rotational angle of the EPB motor 71 is not constant during the travel of the vehicle 1, the indices of the magnitude of the force input from the road surface can be appropriately acquired by calculating the difference between the estimated voltage Ea' corresponding to the stop angle $\phi_{stop}$ and the output voltage Ea and the difference between the estimated voltage Eb' corresponding to the stop angle $\phi_{stop}$ and the output voltage Eb, resulting in precise road surface determination.

Modified Example of Second Embodiment

Stop Voltage Storage Processing

Figure 17:
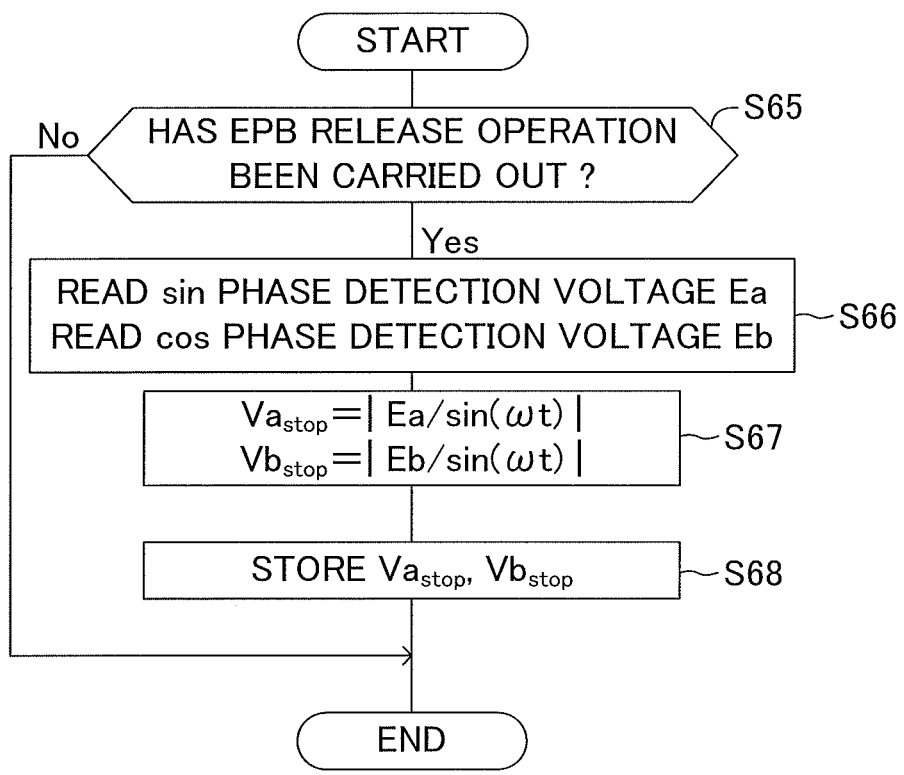
FIG. 17 is a flowchart illustrating a stop amplitude storage routine.

In the above-mentioned second embodiment, the stop angle $\phi_{stop}$ is stored as a stop state of the EPB motor 71. In this modified example, the amplitudes (voltages acquired by removing the excitation voltage sin(ωt)) of the sin phase detection voltage Ea and the cos phase detection voltage Eb, respectively at the stop position of the EPB motor 71 are stored, and those stored amplitudes are used for the road surface determination. FIG. 17 illustrates a stop amplitude storage routine executed by the unsprung state detection part 140. The stop amplitude storage routine is repeatedly executed at a predetermined short period while the vehicle 1 is stopped.

When this routine starts, in the step S65, the unsprung state detection part 140 reads the activation signal of the EPB control part 150 to determine whether the release operation of the EPB has been carried out or not. This processing is the same as the processing executed in the step S61 of the stop angle storage routine. When the unsprung state detection part 140 has not detected the EPB release signal, in the step S65, the unsprung state detection part 140 makes a determination, "No", and once finishes this routine. On the other hand, when the unsprung state detection part 140 has detected the EPB release signal, in the step S66, the unsprung state detection part 140 reads the sin phase detection voltage Ea and the cos phase detection voltage Eb output by the resolver 41. Then, in the step S67, the unsprung state detection part 140 calculates amplitudes $Va_{stop}$ and $Vb_{stop}$, which are values acquired by following Expressions (9) and (10), respectively and obtained by dividing the sin phase detection voltage Ea and the cos phase detection voltage Eb by the excitation signal sin(ωt), respectively. In this case, the unsprung state detection part 140 carries out the calculation by using the excitation signal sin(ωt) at the time when the unsprung state detection part 140 reads the sin phase detection voltage Ea and the cos phase detection voltage Eb. The amplitudes $Va_{stop}$ and $Vb_{stop}$ are hereinafter referred to as stop amplitudes $Va_{stop}$ and $Vb_{stop}$, respectively.

$$Va_{stop}=|Ea/\sin(\omega t)| \quad (9)$$

$$Vb_{stop}=|Eb/\sin(\omega t)| \quad (10)$$

In the step S68, the unsprung state detection part 140 stores the calculated stop amplitudes $Va_{stop}$ and $Vb_{stop}$ in the nonvolatile memory, and once finishes this routine. This routine is repeatedly executed, and the latest stop amplitudes $Va_{stop}$ and $Vb_{stop}$ (the stop amplitudes $Va_{stop}$ and $Vb_{stop}$ when the EPB was released in the previous routine) are thus stored. Note that, in this example, the stop amplitudes $Va_{stop}$ and $Vb_{stop}$ are stored, but the sin phase detection voltage Ea, the cos phase detection voltage Eb, and the excitation signal sin(ωt) may be stored instead, because the amplitudes $Va_{stop}$ and $Vb_{stop}$ can be substantially acquired thereby.

Travel Road Surface Determination Processing 5

Figure 18:
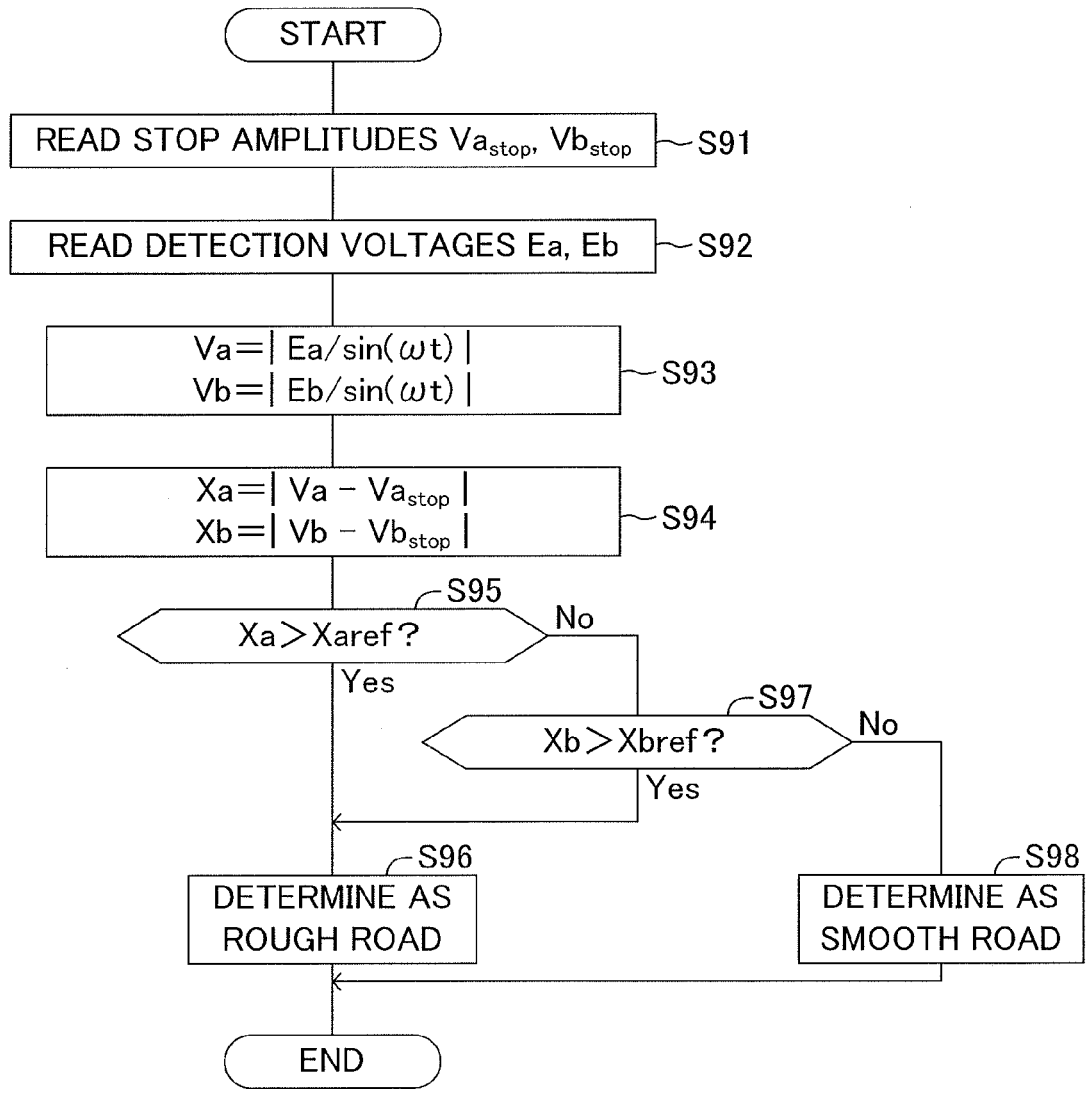
FIG. 18 is a flowchart illustrating a fifth travel road surface determination routine.

The unsprung state detection part 140 uses those stop amplitudes $Va_{stop}$ and $Vb_{stop}$ to carry out fifth travel road surface determination processing. FIG. 18 illustrates a fifth travel road surface determination routine executed by the unsprung state detection part 140 in the second embodiment. The fifth travel road surface determination routine is repeatedly executed at a predetermined short calculation cycle while the vehicle 1 is traveling.

When this routine starts, in the step S91, the unsprung state detection part 140 reads the stop amplitudes $Va_{stop}$ and $Vb_{stop}$ stored in the nonvolatile memory. Then, in the step S92, the unsprung state detection part 140 reads the sin phase detection voltage Ea, which is the output voltage of the sin phase detection coil 45 of the resolver 41, and the cos phase detection voltage Eb, which is the output voltage of the cos phase detection coil 46 of the resolver 41. Then, in the step S93, based on Expressions (11) and (12), the unsprung state detection part 140 calculates an amplitude Va at the current time point (referred to as current amplitude Va) acquired by dividing the sin phase detection voltage Ea by the excitation signal sin(ωt), and an amplitude Vb at the current time point (referred to as current amplitude Vb) acquired by dividing the cos phase detection voltage Eb by the excitation signal sin(ωt). In this case, the unsprung state detection part 140 carries out the calculation by using the excitation signal sin(ωt) at the time when the unsprung state detection part 140 reads the sin phase detection voltage Ea and the cos phase detection voltage Eb.

$$Va=|Ea/\sin(\omega t)| \quad (11)$$

$$Vb=|Eb/\sin(\omega t)| \quad (12)$$

Then, in the step S94, the unsprung state detection part 140 calculates the variation amount Xa ($=|Va-Va_{stop}|$), which is a magnitude of a difference between the stop amplitude $Va_{stop}$ and the current amplitude Va, and the variation amount Xb ($=|Vb-Vb_{stop}|$), which is a magnitude of a difference between the stop amplitude $Vb_{stop}$ and the current amplitude Vb.

When the relative position of the rotational center axis of the resolver rotor 42 is not changed with respect to the resolver stator 43, the variations in the amplitudes Va and Vb, which are not caused by the change in the rotational angle of the EPB motor 71, are small (at a level of a calculation error). Therefore, the current amplitudes Va and Vb are values that are approximately the same as the stop amplitudes $Va_{stop}$ and $Vb_{stop}$, respectively. On the other hand, when the EPB motor 71 or the resolver 41 is vibrated by a force input from the road surface to the unsprung part, the relative position of the rotational center axis of the resolver rotor 42 is changed in the radial direction, proportionally to the magnitude of the vibration. Therefore, the variation amounts Xa and Xb are increased. Thus, the variation amounts Xa and Xb can be used as the indices of the magnitude of the force input to the unsprung part.

Then, in the step S95, the unsprung state detection part 140 determines whether or not the variation amount Xa is more than the determination threshold Xaref. When the variation amount Xa is more than the determination threshold Xaref, in the step S96, the unsprung state detection part 140 determines that the travel road on which the vehicle 1 is traveling is a rough road. On the other hand, when the variation amount Xa is equal to or less than the determination threshold Xaref, in the step S97, the unsprung state detection part 140 determines whether or not the variation amount Xb is more than the determination threshold Xbref. When the variation amount Xb is more than the determination threshold Xbref, in the step S96, the unsprung state detection part 140 determines that the travel road on which the vehicle 1 is traveling is a rough road. On the other hand, when the variation amount Xb is equal to or less than the determination threshold Xbref, in the step S98, the unsprung state detection part 140 determines that the travel road on which the vehicle 1 is traveling is a smooth road.

When the travel road surface determination is completed, the unsprung state detection part 140 once finishes this routine. Then, the unsprung state detection part 140 repeatedly executes this routine at a predetermined calculation cycle. Each time the unsprung state detection part 140 determines the road surface state, the unsprung state detection part 140 successively outputs the determination result to the suspension ECU (not shown). The suspension ECU changes the damping force of the shock absorber based on the road surface determination result.

In the above-mentioned modified example, the same operations and effects as the operations and the effects of the second embodiment are provided.

Although the embodiments and the modified examples of the present invention have been described above, the present invention is not limited to those embodiments and modified examples, and can adopt various other modified examples within the scope of the present invention. For example, a plurality of the embodiments and the modified examples may be combined.

For example, in the embodiments, the rotational angle sensors 40 and 72 for detecting the rotational angles of the motors 30 and the EPB motors 71 installed on the unsprung parts are used to acquire the degree of the vibrations of the unsprung parts, in other words, to acquire the indices of the magnitudes of the forces input to the unsprung parts. However, the present invention does not always need to use the rotational angle sensors for the motors installed on the unsprung parts, and may use rotational angle sensors for motors on a sprung part to acquire an index of an external force acting on the sprung part.

Moreover, the motor installed on the unsprung part is not limited to the travel driving motor or the EPB motor, and may be, for example, a motor that rotates in response to the brake operation generated by the driver during the travel of the vehicle so as to press the brake pads to the brake disc to apply braking force to the brake disc.

Moreover, in the embodiments, the resolver rotational angle sensor including the resolver and the resolver calculator is employed as the rotational angle sensor, but any rotational angle sensor of a magnetism detection type may be used, such as a rotational angle sensor of a type of outputting a magnetism detection signal changing depending on a rotational position (rotational angle) of a rotor including a permanent magnet.

Moreover, in the embodiments, the vibration state of the unsprung part serving as the index of the magnitude of the force acting on the vehicle 1 from the outside is detected based on the variation in the detection signal of the resolver 41 or the variation in the detected angle, and the road surface state is determined based on the vibration state, but the present invention does not always need to determine the road surface state, and the object of using the index of the magnitude of the force acting on the vehicle from the outside may be arbitrarily set.

Moreover, the two embodiments and the modified examples may be arbitrarily combined in order to acquire the index of the magnitude of the force acting on the vehicle 1 from the outside. Moreover, a plurality of modified examples may be combined to increase the precision of the determination of the direction of the force acting on the vehicle 1.

The invention claimed is:

1. A vehicle state detection device for a vehicle comprising:
   a motor for the vehicle, wherein the vehicle has wheels;
   a rotational angle sensor associated with one of the wheels of the vehicle, the rotational angle sensor including:
      a magnetism detection signal output part comprising a rotor to be rotated by a rotation of the motor, and a stator arranged around the rotor, the magnetism detection signal output part being configured to output a magnetism detection signal changing in response to a relative positional relationship between the rotor and the stator; and
      a rotational angle calculation part for calculating a rotational angle of the motor based on the magnetism detection signal output by the magnetism detection signal output part; and
   an electronic control unit, connected with the rotational angle sensor, and programmed to detect a variation in the magnetism detection signal output from the magnetism detection signal output part, which is generated by a change of a relative position between the rotor and the stator of the rotational angle sensor toward a direction other than a rotational direction of the rotor, and acquire a magnitude of the variation as an index of a magnitude of a force acting on the wheel associated with the rotational angle sensor from a road surface on which the vehicle is traveling.

2. A vehicle state detection device according to claim 1, wherein the motor is installed on an unsprung part of the vehicle.

3. A vehicle state detection device according to claim 2, wherein the electronic control unit is further programmed to determine, based on the index of the magnitude of the force, a state of the road surface.

4. A vehicle state detection device according to claim 2, wherein the rotational angle sensor is a resolver rotational angle sensor, the resolver rotational angle sensor comprising:
   a resolver comprising:
      an excitation coil to be supplied with an excitation AC signal;
      a sin phase detection coil to be excited by the excitation coil to output a sin phase detection signal, which is a voltage signal having an amplitude corresponding to a sin value of a relative rotational angle of the rotor with respect to the stator; and a cos phase detection coil to be excited by the excitation coil to output a cos phase detection signal, which is a voltage signal having an amplitude corresponding to a cos value of the relative rotational angle of the rotor with respect to the stator; and a resolver calculation part for calculating the rotational angle of the motor based on the sin phase detection signal and the cos phase detection signal output by the resolver.

5. A vehicle state detection device according to claim 4, wherein, in the resolver: the excitation coil is arranged on the rotor and the sin phase detection coil and the cos phase detection coil are arranged on the stator; and one of the sin phase detection coil and the cos phase detection coil is arranged so that a vehicle vertical direction component of the arrangement of the one of the sin phase detection coil and the cos phase detection coil with respect to the rotor is more than a vehicle vertical direction component of the arrangement of the other another of the sin phase detection coil and the cos phase detection coil with respect to the rotor, and the other of the sin phase detection coil and the cos phase detection coil is arranged so that a vehicle longitudinal direction component of the arrangement of the other of the sin phase detection coil and the cos phase detection coil with respect to the rotor is more than a vehicle longitudinal direction component of the arrangement of the one of the sin phase detection coil and the cos phase detection coil with respect to the rotor, and wherein the electronic control unit is further programmed to determine, based on a variation in the sin phase detection signal and a variation in the cos phase detection signal, which are generated by the change of the relative position between the rotor and the stator of the rotational angle sensor toward the direction other than the rotational direction of the rotor, whether a direction of a force acting on the unsprung part from the road surface is the vehicle vertical direction or the vehicle longitudinal direction.

6. A vehicle state detection device according to claim 4, wherein the electronic control unit is further programmed to determine, when both outputs of the sin phase detection signal and the cos phase detection signal are less than a threshold, that a force in a vehicle lateral direction is acting on the unsprung part from the road surface.

7. A vehicle state detection device according to claim 4, wherein a resonance frequency of a support part for supporting the rotor in the motor or the resolver is set to be different from an unsprung resonance frequency.

8. A vehicle state detection device according to claim 4, wherein a resonance frequency in a vehicle vertical direction and a resonance frequency in a vehicle longitudinal direction of a support part for supporting the rotor in the motor or the resolver are set to be different from each other, and wherein the electronic control unit is further programmed to analyze frequency components of the rotational angle calculated by the rotational angle calculation part, and to determine, based on a magnitude of a resonance frequency component in the vehicle vertical direction of the support part and a magnitude of a resonance frequency component in the vehicle longitudinal direction of the support part included in the frequency components of the rotational angle, whether a direction of a force acting on the unsprung part from the road surface is the vehicle vertical direction or the vehicle longitudinal direction.

9. A vehicle state detection device according to claim 1, wherein the motor is an in-wheel motor installed on an unsprung part of the vehicle for driving the wheel.

10. A vehicle state detection device according to claim 1, wherein the motor is a motor installed on an unsprung part of the vehicle for applying only a braking force to the wheel.

11. A vehicle state detection device according to claim 10, wherein the motor is a motor installed on the unsprung part of the vehicle, and configured not to rotate while the vehicle is traveling, wherein the vehicle state detection device further comprises storage means for storing the rotational angle of the motor or a magnitude of the magnetism detection signal after an end of a previous operation of the motor, and wherein the electronic control unit is further programmed to detect, during a travel of the vehicle, a variation in the magnitude of the magnetism detection signal output from the magnetism detection signal output part with respect to the magnitude of the magnetism detection signal derived from the rotational angle stored in the storage means or the magnitude of the magnetism detection signal stored in the storage means.

* * * * *